United States Patent [19]

Maeda et al.

[11] 3,777,350

[45] Dec. 11, 1973

[54] COMPONENT MOUNTING APPARATUS

[75] Inventors: Yoshinobu Maeda, Katano-shi, Osaka; Kazumi Takamori, Takatsuki-shi, Osaka; Tadao Kanno, Yamatokoriyama, Nara-ken, all of Japan

[73] Assignee: Matsushita Electric Industrial Co., Ltd., Kadoma-shi, Osaka-fu, Japan

[22] Filed: July 25, 1972

[21] Appl. No.: 275,046

[30] Foreign Application Priority Data

| | | |
|---|---|---|
| July 26, 1971 | Japan | 46/56214 |
| July 26, 1971 | Japan | 46/56221 |
| July 26, 1971 | Japan | 46/56220 |
| July 26, 1971 | Japan | 46/56223 |
| July 26, 1971 | Japan | 46/56224 |
| July 26, 1971 | Japan | 46/56219 |
| July 26, 1971 | Japan | 46/56218 |
| July 26, 1971 | Japan | 46/56217 |
| July 26, 1971 | Japan | 46/56216 |
| July 26, 1971 | Japan | 46/56215 |
| July 26, 1971 | Japan | 46/56225 |
| Mar. 28, 1972 | Japan | 47/31033 |
| July 26, 1971 | Japan | 46/56222 |

[52] U.S. Cl. .......... 29/203 B

[51] Int. Cl. .......... H05k 13/04

[58] Field of Search .......... 29/203 B, 203 D, 29/203 S, 203 R

[56] References Cited

UNITED STATES PATENTS 2,850,737 9/1958 Walsh .......... 29/203 B

*Primary Examiner*—Thomas H. Eager
*Attorney*—E. F. Wenderoth

[57] ABSTRACT

A component mounting apparatus for automatically inserting and clinching terminal projections extending in generally radial or parallel relation from their component or other bodies, which generally comprises a supply unit including a plurality of component magazines, a cutter unit for separating each one of the components from their supporting member, a feeder unit including an attitude control for adjusting the attitude of each one of the components fed thereto to a predetermined attitude, a retainer unit for delivering the component to a component inserting unit, the inserting unit including nippers for picking up and releasing the component and a clincher unit for clinching the terminal projections to secure the component on a workpiece.

14 Claims, 59 Drawing Figures

(a) (b)

(a)

(a) (b)

COMPONENT MOUNTING APPARATUS

Figure 1:
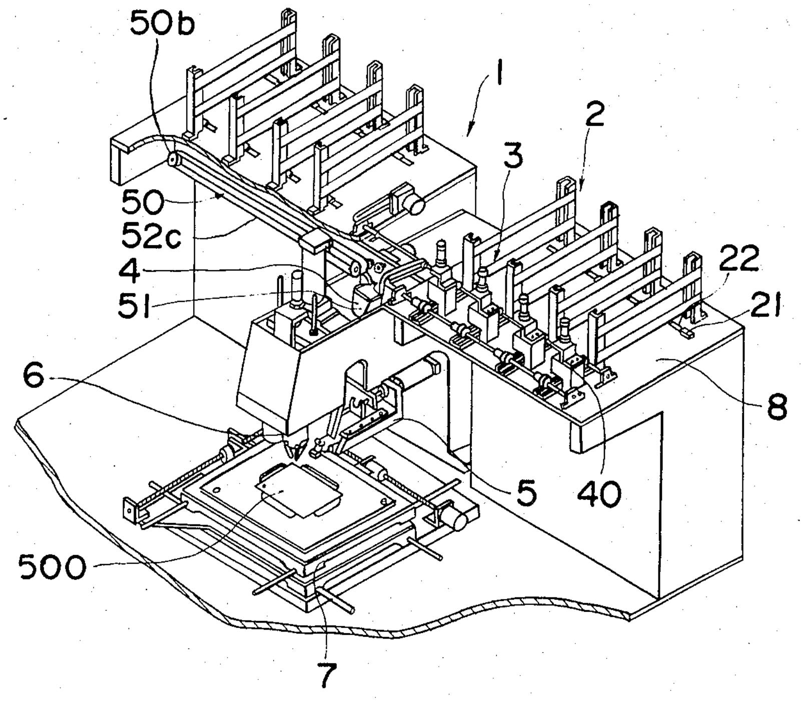

The present invention relates to a component mounting apparatus and, more particularly, to a component mounting apparatus for automatically inserting and clinching terminal projections such as leads extending in generally radial or parallel relation from their component or other bodies. It will be understood that, although the present invention is herein disclosed as applied to a machine for installing disc-type capacitors, it is in various aspects not restricted to capacitors of this type and may well have application to machines for dealing with other components, both electronic and otherwise, particularly when they are of non-uniform shape.

Prior art apparatuses of this kind are disclosed in the U.S. Pat. Nos.2,850,737 and 2,916,165 patented on Sept. 9, 1958 and Dec. 8, 1959, respectively. The invention disclosed in the first numbered U.S. Patent is directed to a component mounting apparatus for mounting on chassis disc-type electric or electronic components usually having radial leads, whereas the invention disclosed in the second numbered U.S. Patent is directed to a mechanism, for use in the above component mounting apparatus, for feeding and controlling the disc-type components so as to be uniformly positioned in order thereafter to be dealt with in a precise and proper manner.

In either of the apparatuses of the above U.S. Patents, the arrangement is such that each one of the disc-type capacitors received in a hopper in a random mass is directly fed to a component inserting unit through a chute shaped to accommodate the shape of the capacitor used, which is in turn mounted on a printed circuit board from the lateral side of the inserting unit while said capacitor is adjusted of its attitude or posture, and finally the capacitor thus mounted on the printed circuit board is firmly held in position by means of a presser element acting to press the capacitor on to the printed circuit board.

However, such conventional apparatuses as described above have not necessarily been satisfactory for use in a production process in view of the fact that the following disadvantages have been found without substan-tially being eliminated.

1. Since the conventional apparatuses are each capable of mounting or inserting only one kind of electric component, the apparatus must be provided in a number corresponding to the number of kinds of electric components to be handled, which not only add to the facility cost, but also require a large floorspace.

2. Since the electric components are supplied in the hopper in a random mass, not only the body of each one of the capacitors in the hopper is susceptible to damage during rotation of the hopper, but also the leads of the capacitor are irregularly modified so that no substantially smooth feeding of the capacitors can be expected during their travel from the hopper to the printed circuit board.

3. Since a vacuum suction device is utilized to deliver each one of the electric components within the rotary hopper to the following chute, it has been often found that the suction device fails to pick up each one of the components to an extent that no satisfactory delivery can be expected.

4. Although the electrical components fed into the chute from the rotary hopper are stored temporarily within the chute in a stacked manner, it will be expected that they will be blocked within the chute only if they are not of uniform shape.

5. Since a consecutive process of inserting and mounting is very complicated, the apparatus itself requires a relatively higher cost of manufacture and maintenance.

6. Since each one of the electric components is inserted on the circuit board while guided by four guide pieces surrounding such electric component during the inserting operation, a relatively larger space is occupied by the four guide pieces and, therefore, the number of electric components inserted per a given space of the circuit board is disadvantageously limited.

7. In view of the fact that each one of the electric components can be successively mounted on the circuit board in a prescribed orientation, the apparatus cannot be effectively utilized a plurality of electric components are to be arranged in various configuration and orientation on the circuit board of a predetermined surface area.

Accordingly, an essential object of the present invention is to provide an improved component mounting apparatus for automatically inserting and clinching terminal projections such as leads extending in generally radial or parallel relation from their component bodies, which substantially eliminates the above mentioned disadvantages inherent in the conventional apparatus of a similar kind.

Another object of the present invention is to provide an improved component mounting apparatus of the above type which automatically and reliably performs the sequential operations of selectively picking up a desired electric component from a plurality of kinds of electric components each having leads for terminal connection, correcting the attitude of each one of the electric components to be supplied to the printed circuit substrate, shaping the leads into a desired shape, mounting each one of the electric components on the printed circuit substrate and clinching terminal projections of the leads of the components mounted on the circuit substrate to secure said component on the circuit substrate.

A further object of the present invention is to provide an improved component mounting apparatus of the above type wherein the component supply unit comprises a plurality of magazines each adapted to accommodate a plurality of component substrates carrying a plurality of transversely laid electric components of one kind, which each one of the components is selectively separated from their component substrate by means of a cutter unit during the subsequent process.

A still further object of the present invention is to provide an improved component mounting apparatus of the above type wherein the feeder unit comprises an attitude control capable of reliably functioning to adjust the attitude of each one of the electric components fed from the supply unit in a predetermined orientation.

A still further object of the present invention is to provide an improved component mounting apparatus of the above type wherein the inserting unit effectively functions to pick up the body of the electric component with the leads downwardly oriented toward the associated holes of the printed circuit board and subsequently to mount said component on the board from above with the leads accurately and reliably inserted through said holes of said circuit board.

A still further object of the present invention is to provide an improved component mounting apparatus of the above type which can be manufactured with the minimum necessary parts at reduced costs with substantial improvement of performance of the apparatus proper.

According to the present invention, the component mounting apparatus generally comprises a supply unit having a plurality of magazines each adapted to accommodate thereon a stack of component substrates each supporting a plurality of arranged electrical components of uniform shape and of one kind, a cutter unit having cutters of the number substantially corresponding to that of the magazine, each of which is adapted to separate in succession electrical components from their supporting substrate, a feeder unit including a component attitude control, a retainer unit for retaining the electrical components fed through said feeder unit, a component inserting unit for receiving the electrical components retained by the retainer unit and for subsequently inserting them in holes of panel members in a selected orientation and a clincher unit positioned beneath the panel member, supported by a suitable positioning unit, for securing each one of the electrical components to the panel member.

In view of the fact that the component mounting apparatus of the present invention is provided with a plurality of magazines, a single circuit unit can be manufactured with such apparatus if electrical components of different kinds, each kind of the components being supported by the compontne supporter base or substrate, are placed in those magazines.

The supply unit and the cutter unit may be operated in such a manner that only one kind of the component substrates is selected in response to a suitable electrical signal, from which one of the components is subsequently separated by the associated one of the cutters of the cutter unit. It will be clear that, depending upon the type of electrical signal, different kinds of the component substrates are selectively ejected from the supply unit and fed to the associated cutter of the cutter unit in a predetermined sequence. Each one of the electrical components thus separated from their component substrates are subsequently transported to the feeder unit by means of a conveyance device, As hereinbefore described, the feeder unit includes the attitude control in which the attitude of the component passing therethrough can be adjusted in a predetermined orientation to facilitate the operation of inserting it in the holes of the printed circuit board by means of the inserting unit. However, after the attitude of the component has been adjusted by the attitude control, the component is then fed to the retainer unit in which the leads of the component are shaped to represent a predetermined shape.

The component inserting unit includes a pair of nippers for nipping the body of the component with the leads downwardly oriented toward the circuit board. These nippers is not only movable vertically, but also rotatable about its longitudinal axis, these movements depending upon the type of electrical signal fed thereto, for mounting the component on the circuit board with the leads inserted in the holes of the circuit board. Portions of the leads extending beyond the circuit board on which the corresponding component has been mounted are clinched by the clincher unit so that no separation of the component from the circuit board takes place.

With the mounting apparatus of the present invention constructed as hereinbefore described, various advantages can be appreciated. By way of example, since no contact among the electrical components occur, no one of the electrical components will be damaged. in addition, various kinds of electrical components are successively mounted on the printed circuit board in a predetermined orientation and in an efficient manner without requiring a relatively larger space between two adjacent electrical components mounted on the circuit board. Thus, it is clear that the component mounting apparatus of the present invention can be advantageously utilized in a production process without incurring the increased manufacturing costs of electrical circuit units.

Figure 2:
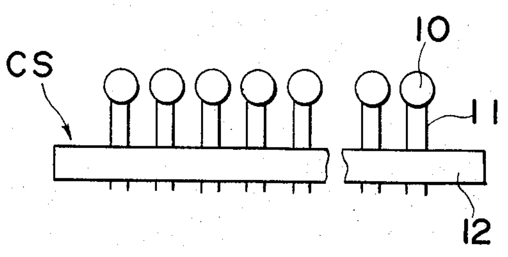
Figure 3:
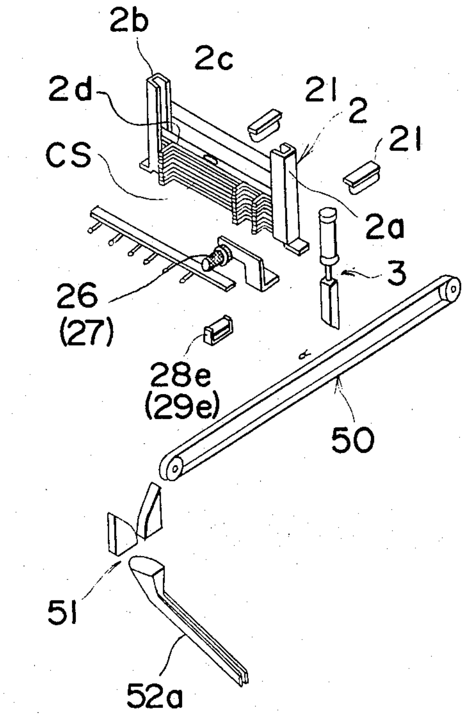
Figure 6:
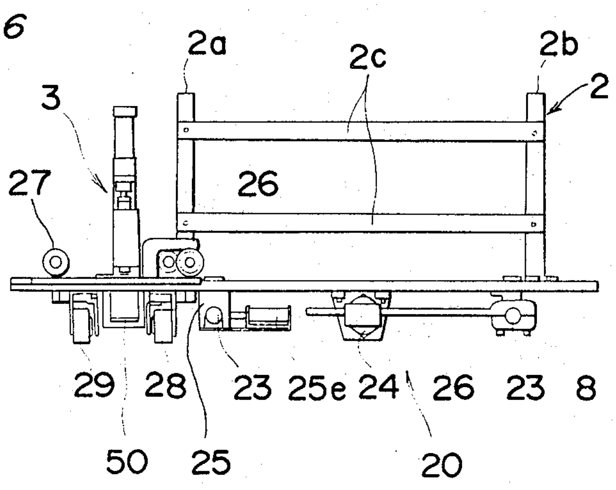
Figure 4:
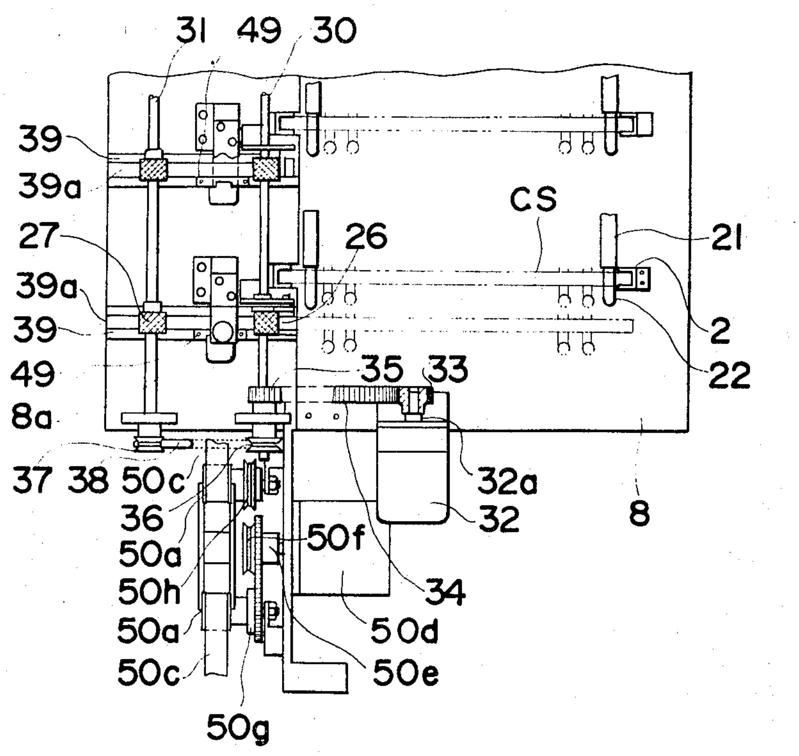
Figure 5:
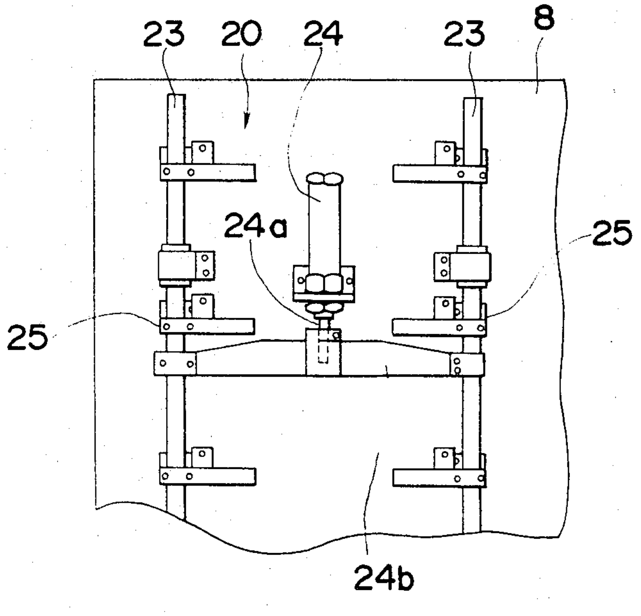
Figure 7:
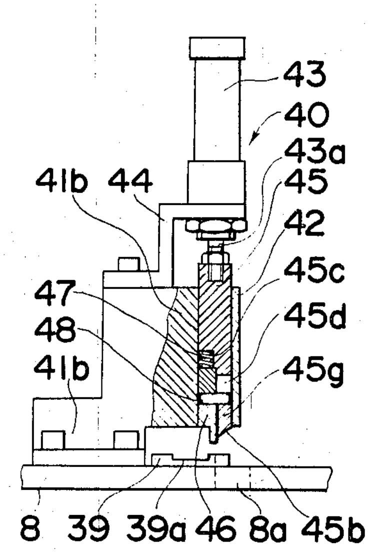
Figure 8:
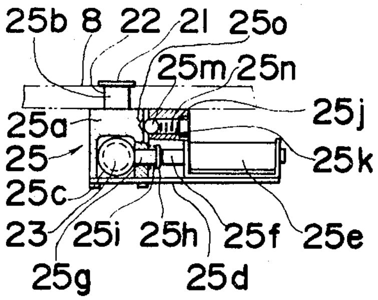
Figure 10:
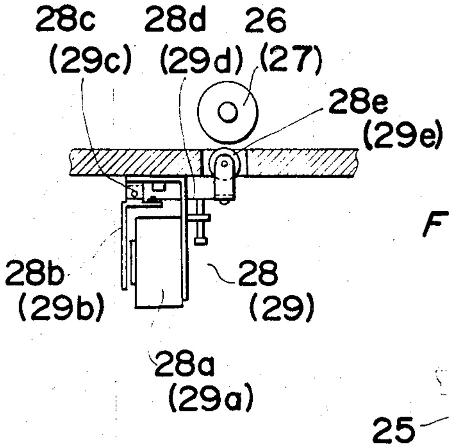
Figure 9:
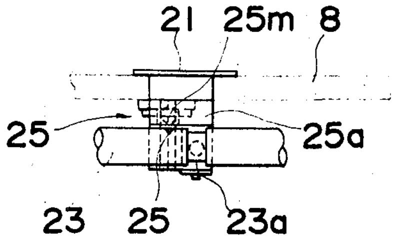
Figure 11:
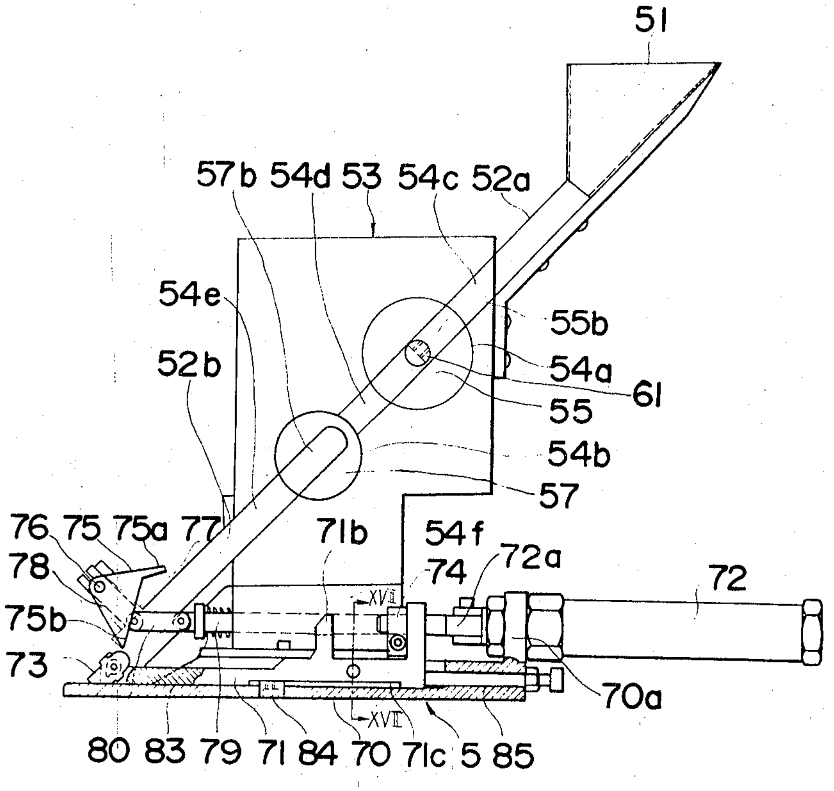
Figure 12:
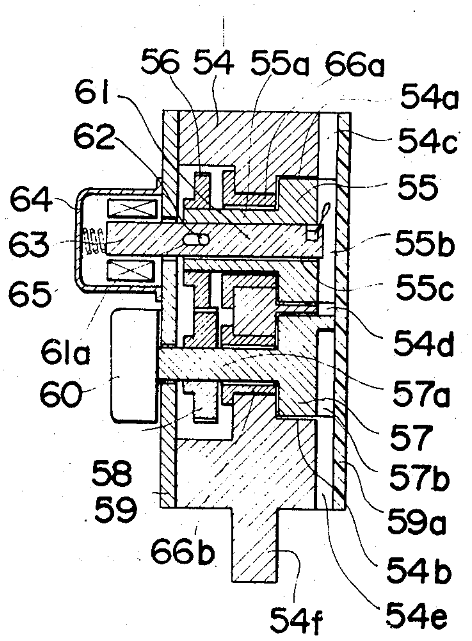
Figure 13:
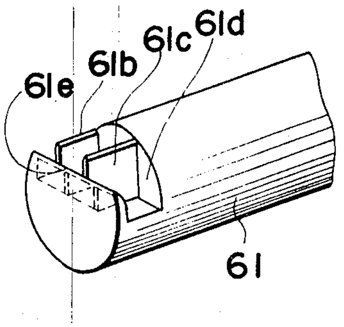
Figure 14:
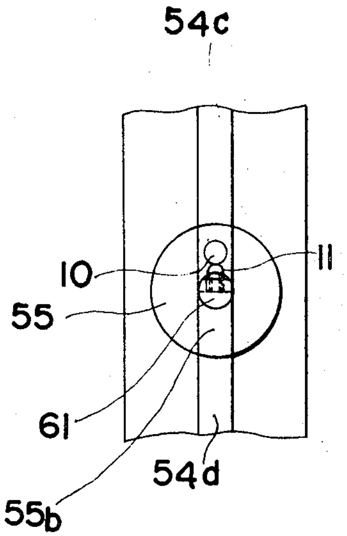
Figure 15:
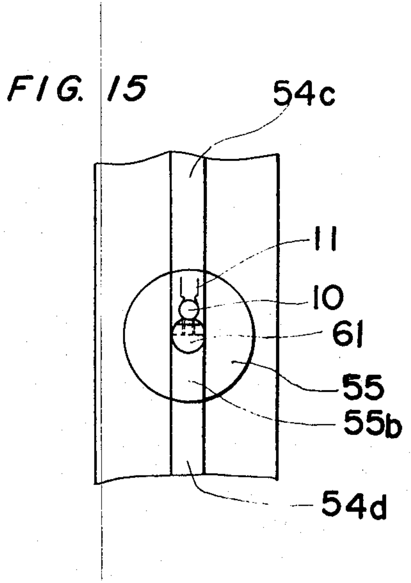
Figure 16:
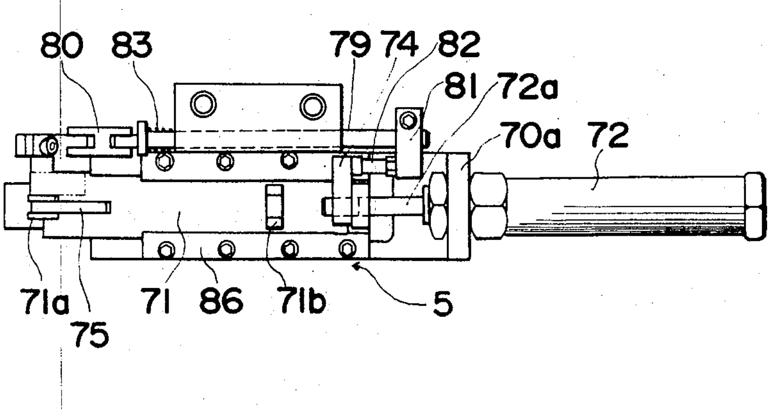
Figure 17:
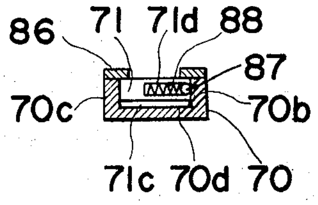
Figure 19:
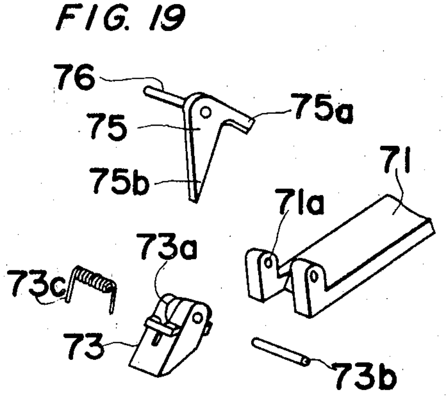
Figure 18:
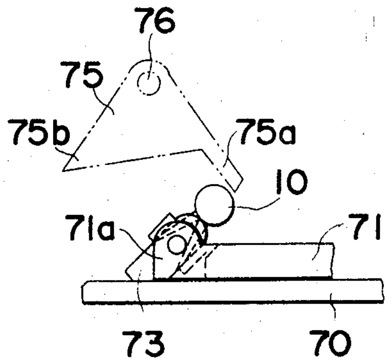
Figure 20:
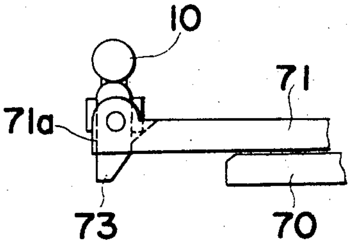
Figure 21:
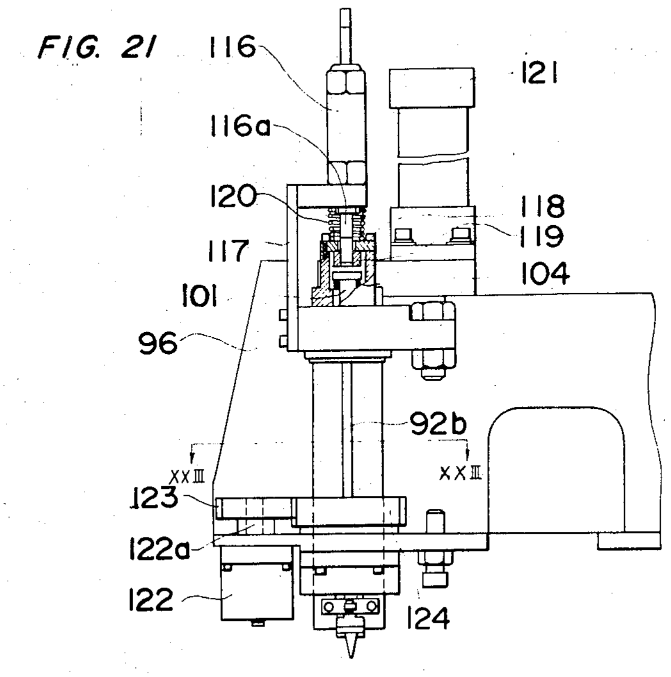
Figure 22:
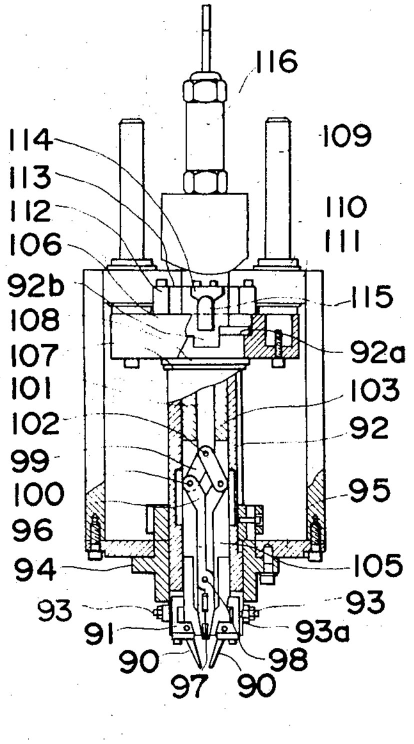
Figure 23:
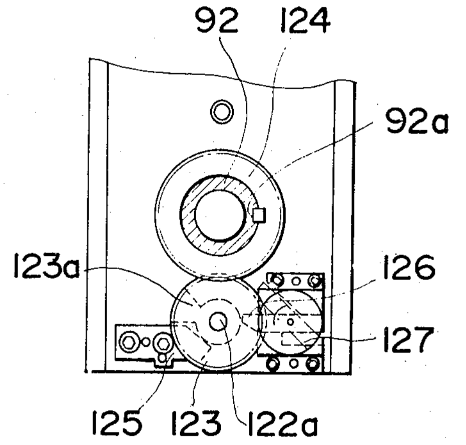
Figure 24:
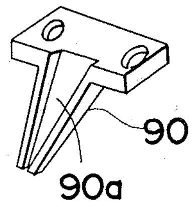
Figure 26:
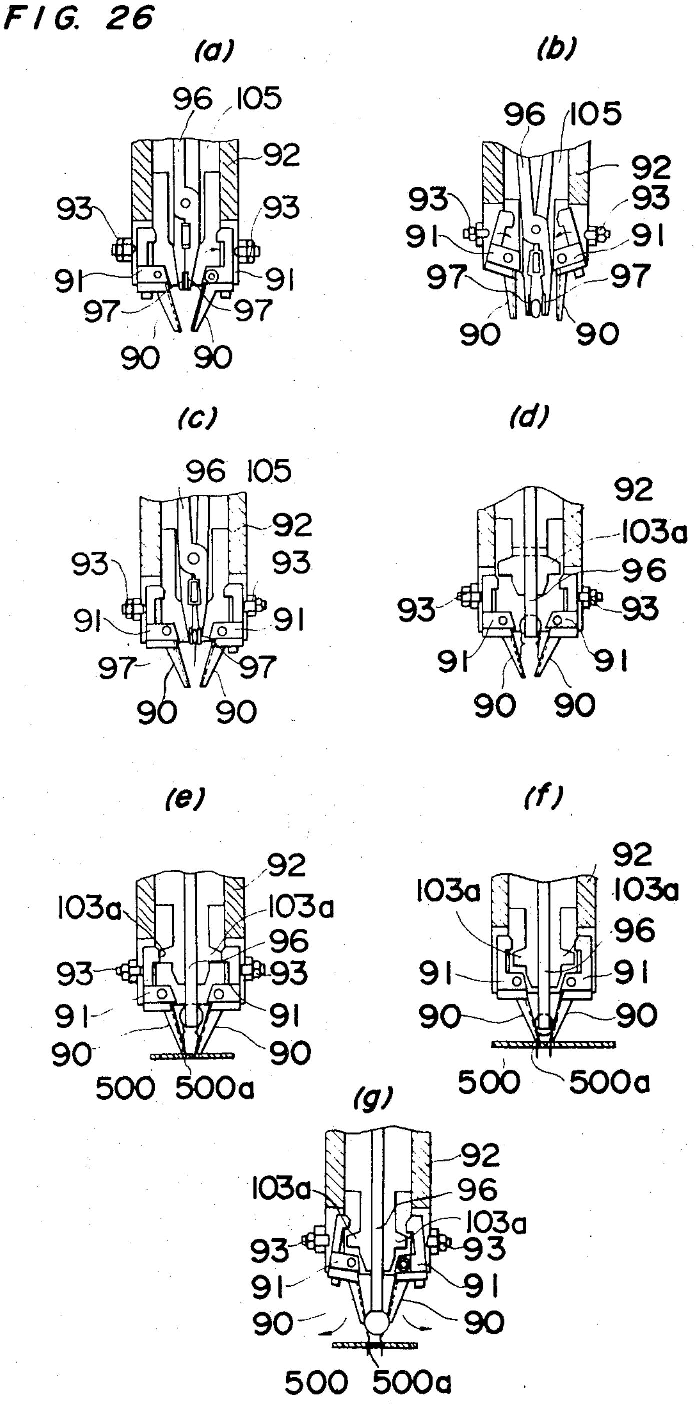
Figure 27:
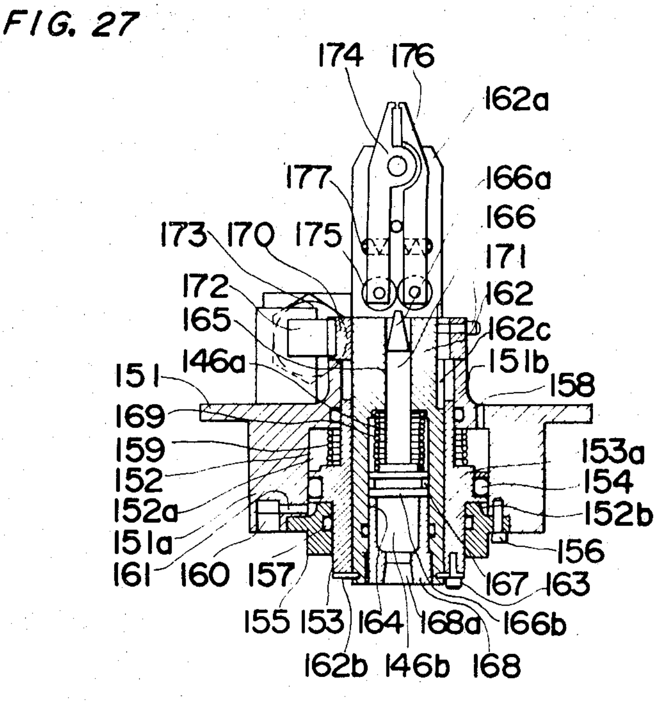
Figure 28:
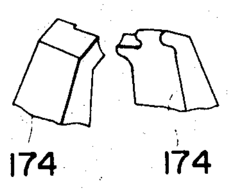
Figure 29:
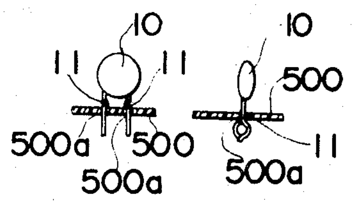
Figure 30:
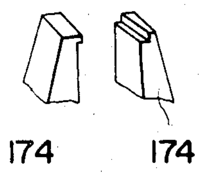
Figure 31:
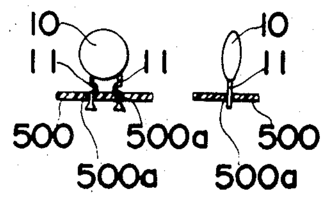
Figure 32:
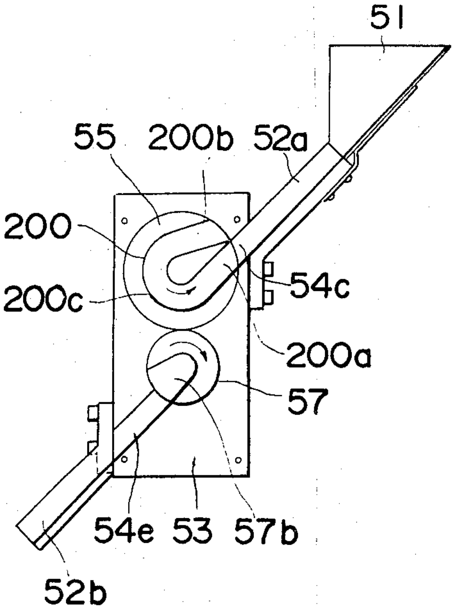
Figure 33:
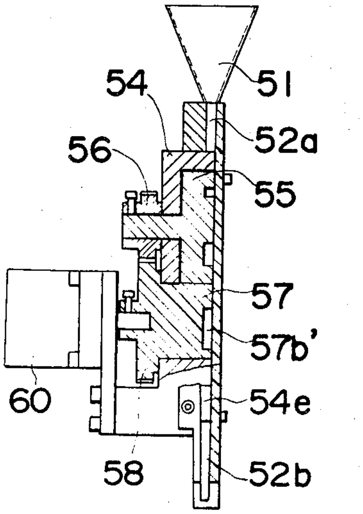
Figure 34:
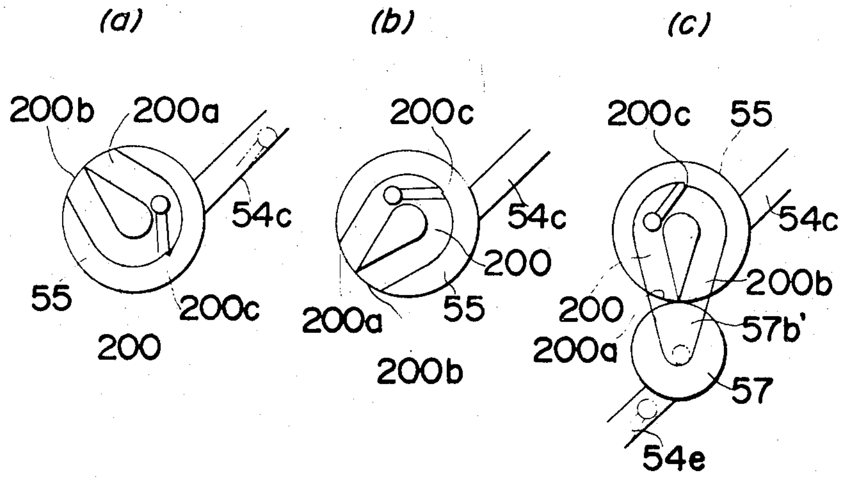
Figure 34:
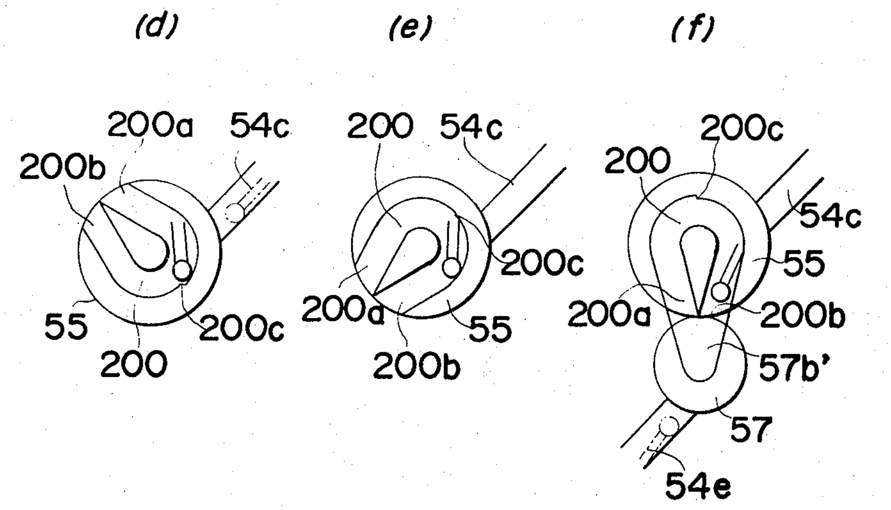
Figures 35, 36:
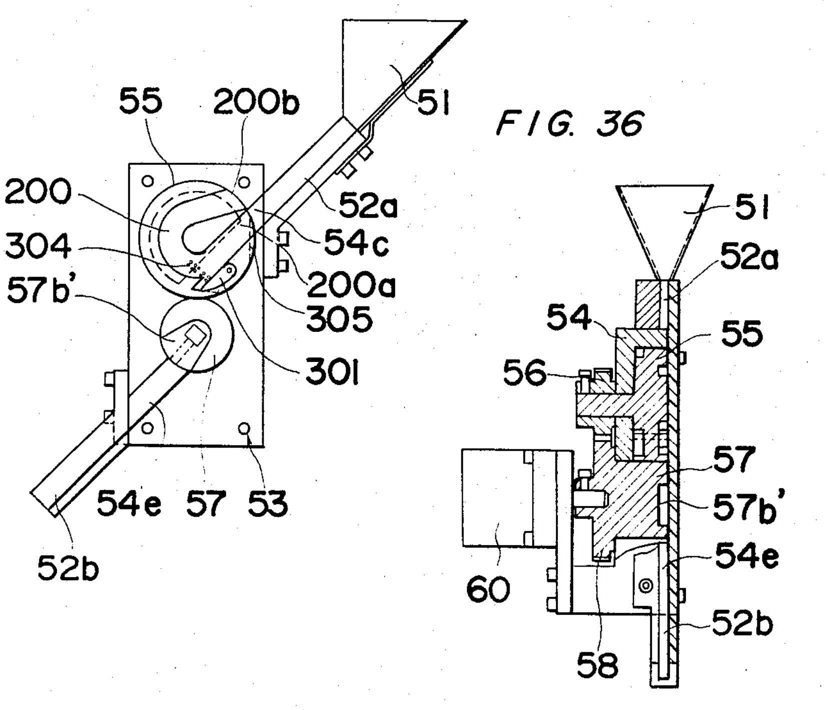
Figure 37:
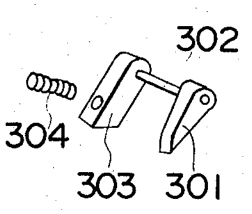
Figure 38:
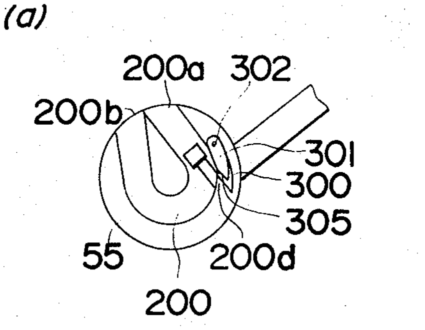
Figure 38:
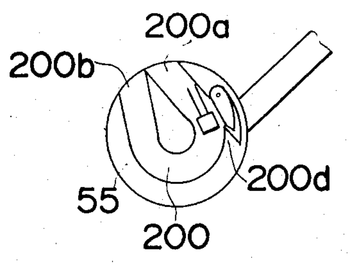
Figure 39:
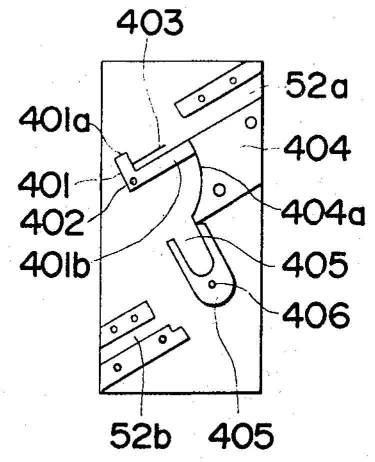
Figure 40:
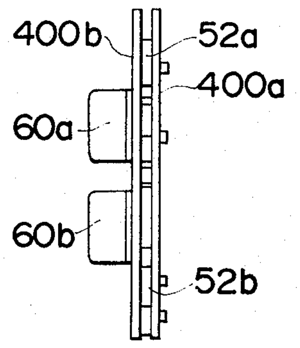
Figure 41A:
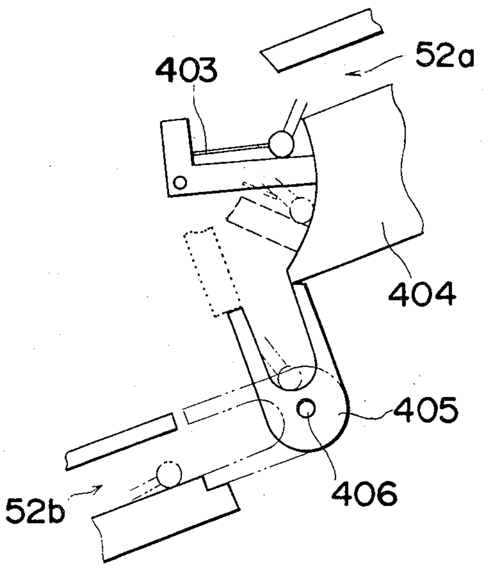

These and other objects and features of the present invention will become apparent from the following description taken in conjunction with preferred embodiments thereof with reference to the accompanying drawings, in which;

FIG. 1 is a schematic perspective view of a component mounting apparatus embodying the present invention, FIG. 2 is a schematic top plan view of a component substrate carrying a plurality of electrical components thereon, FIG. 3 is a schematic diagram showing a manner in which a selected one of the components is fed to the feeder unit, FIG. 4 is a top plan view of a portion of the component mounting apparatus shown in FIG. 1, FIG. 5 is a bottom plan view, on an enlarged scale, of a portion of FIG. 4, showing an arrangement of an ejector for selectively ejecting each one of the component substrates from its associated magazine, FIG. 6 is a schematic side view of FIG. 4, FIG. 7 is a partially cross-sectional side view, on an enlarged scale, of one of cutters of the cutter unit, FIG. 8 is a side cross section of one of clutch blocks employed in the component mounting apparatus, FIG. 9 is a side view of FIG. 8, FIG. 10 is a side view showing a portion of a component substrate drawing mechanism employed in the mounting apparatus, FIG. 11 is a schematic view of the feeder unit and the retainer unit, FIG. 12 is a schematic cross-sectional view, on an enlarged scale, of an attitude control shown in FIG. 11, FIG. 13 is a schematic perspective view, on an enlarged scale, of an essential portion of the attitude control shown in FIG. 12, FIG. 14 is a schematic diagram showing a manner in which a component which is upstanding in attitude is received by the inverter bar shown in FIG. 13, FIG. 15 is a similar diagram to FIG. 14, but showing a manner in which the component which is reversed in attitude is received by the inverter bar shown in FIG. 13, FIG. 16 is a top plan view of the retainer unit shown in FIG. 11 with the feeder unit removed away, FIG. 17 is a cross sectional view taken along the line XVII—XVII in FIG. 11, FIG. 18 is a schematic diagram showing a manner in which the electrical component is supported by a saddle-like element of the retainer unit, FIG. 19 is an exploded view of FIG. 18, FIG. 20 is a similar diagram to FIG. 18, showing a manner in which the saddle-like element is brought to an upright position as a slidable strip carrying said saddle-like element is projected beyond a platform, FIG. 21 is a partially sectional side view of a component inserting unit, FIG. 22 is a front sectional view, on an enlarged scale, of an essential portion of the component inserting unit shown in FIG. 21, FIG. 23 is a cross sectional view taken along the line XXIII—XXIII in FIG. 21, FIG. 24 is a schematic perspective view of one of lead guides employed in the inserting unit, FIGS. 25*a* to *d* are diagrams showing a sequential manner in which an outer hollow shaft and an inner hollow shaft are engaged to each other for determining the orientation of the lead inserting nippers and the lead guides, FIGS. 26*a* to *g* are diagrams showing a manner in which the electrical component is picked up, released and mounted on a workpiece in sequence in the particular order, FIG. 27 is a sectional side view of a clincher unit employed in the mounting apparatus, FIG. 28 is a diagram showing the shape of a pair of anvil members employed in the clincher unit, FIGS. 29*a* and *b* are front and side views, respectively, of the electrical component showing a manner in which it has been mounted on the workpiece with terminal projections clinched by the anvil members having the shape shown in FIG. 28, FIG. 30 is a diagram showing a modified shape of the pair of the anvil members employed in the clincher unit, FIGS. 31*a* and *b* are similar views to FIG. 29 *a* and *b*, respectively, but showing a manner in which it has been mounted on the workpiece with the terminal projections clinched by the anvil member having the shape shown in FIG. 30, FIG. 32 is a schematic view of the attitude control of modified construction, FIG. 33 is a sectional side view of FIG. 32, FIGS. 34*a* to *f* are schematic diagrams showing a sequential manner in which the modified control operates with the standing component and the reversed component, respectively, FIG. 35 is a similar view to FIG. 32, but show ing the control of further modified construction, FIG. 36 is a sectional side view of FIG. 35, FIG. 37 is an exploded view, on an enlarged scale, of a portion of the attitude control shown in FIG. 35, FIGS. 38*a* and *b* are schematic diagrams showing a manner in which the further modified control operates with the standing component and the reversed component, respectively, FIG. 39 is a schematic view of the attitude control of still further modified construction, FIG. 40 is a side view of FIG. 39, and FIGS. 41*a* and *b* are schematic diagrams showing a manner in which the still further modified control operates with the standing component and the reversed component, respectively.

The component mounting apparatus according to the present invention has an outer appearance, though not to be limited thereto, as shown in FIG. 1 and generally comprises a supply unit 1 having a plurality of magazines 2 each adapted to accommodate thereon a stack of component substrates each supporting a plurality of arranged electrical parts of the same type, a cutter unit 3 having cutters of the number substantially corresponding to that of the magazines 2, each of which is adapted to separate in succession electrical components from their supporting substrate, a feeder unit 4, a retainer unit 5 for retaining the electrical components fed through the feeder unit 4, a component inserting unit 6 for receiving the electrical components retained by the retainer unit 5 and for subsequently inserting them in holes of panel members in succession, a positioning unit 7 for positioning the panel member with respect to the inserting unit 6 and a clincher unit positioned beneath the panel member, supported by the positioning unit 7, for securing each one of the electrical components to the panel member.

Each one of the magazines 2 may be either detachable from or rigidly attached to the component mounting apparatus proper. Particularly in the former case, an additional advantage can be appreciated that a spare magazine accommodating a stack of the same electrical components may be kept on hand for the purpose of ready replacement which is to be carried out when the component substrates in the magazine have been consumed. Furthermore, while the substrates used to support electrical components is preferably of the same size and each of them is used to support a plurality of electrical components of the same type in terms of dimensions, size or electrical characteristics, the magazines may be used to accommodate respective stacks of component substrates of electrical components of different type. By way of example, in the case where a certain printed circuit board requires a number of electrical components including resistors, capacitors and other like elements all necessary to complete a circuit unit, the component mounting apparatus of the present invention can finish the circuit unit automatically if the magazines are provided in a number corresponding to that of the electrical components required.

The type and/or configuration of each one of the magazine may be determined by the type and/or configuration of the component substrate employed, and vice versa. However, the details of the component substrate will be first described with reference to FIG. 2, followed by the details of the mounting apparatus to be described as employing the component substrate of the specified type and/or configuration.

Referring now to FIG. 2, the component substrate is shown as formed with a number of disc-type capacitors 10 each having a pair radial leads 11 laterally extending therefrom in substantial parallel relation with respect to each other. The radial leads 11 may not be parallel with respect to each other, however, in this case, the optimum result of operation of the mounting apparatus will be understood as insured if the distance between both free end extremities of the respective leads 11 does not exceed the diameter of the disc-type capacitor (or the width thereof if the capacitor or like electrical component is of substantially square or rectangular shape).

The component substrate comprises a strip-shaped sheet member (not visible) made of inexpensive paper material such as carton or the like and a length of commercially available adhesive tape 12 of the substantially same size as that of the sheet member. The adhesive tape 12 is adapted to secure pairs of free end portions of the leads 11 of the capacitors 10 firmly on one surface of the sheet member in equidistantly spaced relation to each other. As shown in FIG. 2, the adhesive tape 12 is placed on the surface of the sheet member with said free end portions of the leads 11 sandwiched therebetween. Thus, it is clear that the capacitors 10 are supported by the component substrate in equidistantly spaced relation with respect to each other and, therefore, no careful handling, which is required where the capacitors are supplied in a random mass, is substantially necessary.

The details of the mounting apparatus proper will be now described in connection with the various units 1 to 7 in the order given above for the purpose of facilitating an easy and better understanding thereof.

Supply Unit

The supply unit 1 comprises, in addition to the magazines 2 as hereinbefore outlined, the corresponding number of ejectors as generally indicated by 20 in FIG. 5. Since the magazines and the ejectors are respectively of the same construction, description will be made in connection with one of the magazines and subsequently the corresponding one of the ejectors for the sake of brevity.

Referring first to FIGS. 1, 3 and 4, the magazine 2 is formed with a pair of channel members *2a* and *2b* each having a groove along which the corresponding end portion of the component substrate is guided and both of which are spacedly connected with a pair of beam members *2c* with the grooves of the channel members *2a* and *2b* facing toward each other, said beam members *2c* extending between said members *2a* and *2b* on one side of said members *2a* and *2b*. Either of the channel members *2a* or *2b* in cooperation with the other channel member *2b* or *2a* receives a plurality of the component substrates CS stacked one over another with the capacitors facing toward the other side of the channel members. A weight *2d* is provided as adapted to lay on the uppermost member of the stack of the component substrates for preventing any one of the substrates CS from warping. Unless otherwise this warping occurs in the stack of the substrates CS, this weight *2d* may be omitted.

The magazine 2 is, either detachably or non-detachably mounted on a table 8, supported by a machine frame in any known manner, behind the cutter unit 3 and above the ejector 20 positioned below the undersurface of the table 8, as shown in FIG. 1.

The ejector 20 includes a pair of nail members 21 exposed above the upper surface of the table 8 through respective slots 22 formed in the table 8 and each having a thickness not greater than the thickness of the substrate CS. As will be described later, the nail members 21 are sinchronously movable in the direction substantially at right angles to the stack of the substrates accommodated in the magazine 2 so that each one of the substrates can be laterally ejected in sequence from the lowermost member of the stacked substrates.

The ejector 20 further includes a pair of spaced slidable rods 23 common to the other ejectors, each of which is slidably suspended below the undersurface of the table 8, a hydraulically operated cylinder 24 common to the other ejectors and a pair of clutch blocks 25 operatively associated respectively with the nail members 21 for transmitting sliding movement of the slidable rods 23 to said nail members 21. For effecting the sliding movement of the rods 23, the cylinder 24 is provided with a reciprocatively movable piston *24a* having one end situated within the cylinder and the other end connected with a substantially intermediate portion of a connecting member *24b*, the both ends of said connecting member being in turn rigidly connected with the slidable rods 23 as shown in FIG. 5.

The clutch blocks 25 respectively associated with the nail members 21 and also with the slidable rods 23 are of the same construction and, therefore, only one of said clutch blocks 25 will be now described with reference to FIGS. 6, 8 and 9. The clutch block 25 comprises a solid body *25a* formed with a projection *25b* extending through the slot 22 and connected with the corresponding nail member 23 and a groove *25c* extending in the direction parallel to the direction of sliding movement of the nail member 21 for loosely receiving therein the corresponding slidable rod 23. There is provided a rigid plate *25d* having one end portion rigidly connected to the solid body *25a* in such a manner as to close the opening of the groove *25c* while the slidable rod 23 is confined within the groove *25c*, and the other end portion carrying thereon a solenoid *25e* rigidly mounted thereon and having an iron core *25f* movable between extended and retracted positions in response to the operating state of the solenoid *25e*. Disposed between a free end extremity of the iron core *25f* and one of walls of the solid body *25a* defining the groove *25c* is a pin member *25g* slidably extending through said one of said walls and having one end engageable in an annular groove *23a* formed in the slidable rod 23 and the other end formed with a spring seat *25h*. The pin member *25g* is normally urged by a compression spring *25i*, interposed between said one of said walls and the spring seat *25h*, with the first mentioned end thereof clear of the annular groove *23a* of the rod 23 and concurrently with the second mentioned end thereof causing the iron core *25f* to be retracted. The iron core *25f* of the solenoid *25e* can be brought to the extended position when said solenoid *25e* is energized, causing the pin member *25g* to move against the compression spring *25i* with the result that the first mentioned end of said pin member *25g* is engaged in the annular groove *23a* of the rod 23. Thus, it is clear that, upon engagement of the end of the pin member *25g* in the groove *23a* of the slidable rod 23, the movement of the slidable rod caused by the cylinder 24 (FIG. 5) can be transmitted to the solid block *25a* and hence the nail member 21 thereby permitting the latter to move in the manner as hereinbefore described.

For preventing an arbitrary movement of the solid body *25a* by frictional contact between said body *25a* and the slidable rod 23 as the latter is moved, a detent device is provided. This detent device comprises a casing *25j* secured to the undersurface of the table 8 and having a hollow chamber *25k*, one end of said chamber *25k* being closed and the other end open toward the solid body *25a*. Within the hollow chamber *25k*, a ball member *25m* and a compression spring *25n* are operatively accommodated in such a way that said ball member *25m* is collapsibly engaged in a recess *25o* formed in the solid body *25a*. Because of this detent device of the above construction, so long as the solenoid *25e* is in the inenergized condition and hence the pin member *25g* is retracted by the compression spring *25i* in the direction clear of the annular groove *23a* of the slidable rod 23, no movement of the clutch block 25 take place even if the slidable rod 23 is moved in the manner as hereinbefore described. The movement of the slidable rod 23 can be transmitted to the clutch block 25 only when the solenoid 25 *e* is energized in which condition the pin member 25*g* is engaged in the annular groove 23*a* against the compression spring 25*e* and the ball member 25*m* can be backwardly collapsed against the compression spring 25*n* as the solid body 25*a* is moved thus clearing off from the recess 25*o*.

For each magazine, a pair of drive rollers 26 and 27 are provided on the table 8 for drawing the component substrate CS ejected from the stack of substrates accommodated in the magazine 2 in cooperation with respective pinch roller assemblies 28 and 29 of the same construction. The both drive rollers 26 and 27 are spaçed a distance preferably smaller than the length of the component substrate CS and rigidly mounted on common shafts 30 and 31, both of which are rotatably supported on the table 8.

An electrically operated motor 32 for rotating the shafts 30 and 31 in the same direction is rigidly mounted on the table 8 and has a motor shaft 32a mounted with a drive gear 33 for rotation therewith. This drive gear 33 is in mesh with an intermediate gear 34 rotatably supported on the table 8 in any known manner, said gear 34 being in turn in mesh with a gear 35 which is rigidly mounted on one of the shafts such as indicated by 30. Thus, it is clear that the rotation of the motor 32 can be transmitted to the shaft 30 through such a gear train for rotating the said shaft 30 in the direction such that the component substrate CS can be drawn to the left as viewed from FIG. 4. For rotating the other shaft 31, a pair of pulleys 36 and 37 are respectively rigidly mounted on the shafts 30 and 31 which are in turn connected with an endless belt 38 for transmitting rotation of the shaft 30 to the shaft 31 thereby permitting the latter to be rotated in the same direction as the rotational direction of the shaft 30.

The pinch roller assemblies 28 and 29 are respectively secured to the undersurface of the table 8 below the drive rollers 26 and 27 each of which comprises an electromagnet 28*a* or 29*a*, a substantially L-shaped movable iron member 28*b* or 29*b* pivotally supported at 28*c* or 29*c* and having long and short members, the long members of said movable iron member being adapted to be selectively attracted or released by the electromagnet 28*a* or 29*a* in response to the operating state of said electromagnet, a leaf spring 28*d* or 29*d* having one end rotatably mounted with a pinch roller 28*e* or 29*e* and the other end connected with the short member of the movable iron member 28*b* or 29*b* and a stopper 28*f* or 29*f* for restricting the stroke of pivotal movement of the movable iron member 28*b* or 29*b* in cooperation with the electromagnet 28*a* or 29*a*. In this arrangement, it is clear that, when the electromagnet is energized, the L-shaped movable iron member pivots with the long member thereof attracted by the electromagnet and concurrently with the pinch roller shifted upwards.

Extending below the drive rollers 26 and 27 and rigidly mounted on the table 8 is a guide rail 39 having a groove 39*a* along which the ejected substrate CS is guided. Portions of the depth of the groove 39*a* and the table 8 which are located just below the drive rollers 26 and 27, respectively, are formed with openings (not indicated) through which the pinch rollers 28*e* and 29*e* of the pinch roller assemblies 28 and 29 in their upwardly shifted conditions can contact with the associated drive rollers 26 and 27.

In operation, when any one of pairs of the clutch blocks are operated with the associated nail members 21 moved so as to eject the lowermost member of the stacked component substrates CS from the associated one of the magazines 2, the ejected component substrates is conditioned such that its front end is ready to be sandwiched between the drive roller 26 and the pinch roller 28*e*. While the drive rollers 26 and 27 are constantly rotated, the ejected component substrate can be forwardly drawn on to a set of the drive roller 27 and the pinch roller 29*e* when the electromagnet 28*a* of the pinch roller assembly 28 as well as the electromagnet 29*a* of the pinch roller assembly 29 are subsequently energized, separately or synchronously, thereby to cause the pinch roller 28*e* to elastically back up the substrate CS urging the latter to the drive roller 26 and concurrently to cause the other pinch roller 29*e* to contact the drive roller 27. Thus, the component substrate CS ejected from the associated magazine 2 is first drawn toward a set of the drive roller 27 and the pinch roller 29*e* by a set of the drive roller 26 and the pinch roller 28*e*. As the front end of the component substrate thus drawn by the drive roller 26 while backed up by the pinch roller 28*e* approaches the drive roller 27, the component substrate squeezes in between the drive roller 27 and the pinch roller 29*e* and, subsequently, the opposed rear end of the same substrage leaves from the set of the drive roller 26 and the pinch roller 28*e*. Of course, during the movement of the ejected component substrate, it is guided along the groove 39*a* of the guide rail 39.

It is to be noted that each of the pinch roller assemblies 28 and 29 or a pair per magazine 2 is intermittently operated to selectively transfer and stop the transference of the component substrate in such a manner that, each time any one of the capacitors 10 of the component substrate is brought in position to be cut off in a manner as will be described later, the electromagnet is brought to the inenergized condition.

It is further to be noted that the cylinder 24 and any one of pairs of the clutch blocks 25 and hence the nail members 21 are selectively operated in a predetermined timed action depending upon the circuit arrangment of a printed circuit board.

CUTTER UNIT

The cutter unit generally indicated by 3 in FIG. 1 comprises a plurality of cutters 40, one for each magazine 2, each of which is disposed substantially intermediate between the drive rollers 26 and 27 on the table 8. These cutters 40 are of the same construction and, therefore, only one of them will be now described with particular reference to FIG. 7.

Referring now to FIG. 7, the cutter 40 comprises a supporting block 41 of the configuration substantially as shown and rigidly mounted on the table 8 as at 41*b* by means of a plurality of bolts and nuts or any other suitable method and formed at 41*b* with a vertical bore 42. A hydraulically operated cylinder 43 having a plunger 43*a*, which is normally retracted, but can be extended upon application of hydraulic medium thereto, is supported by the supporting block 41 by means of a bracket member 44 with the plunger 43*a* in alignment with the longitudinal axis of the vertical bore 42. The plunger 43*a* of the cylinder 43 is rigidly connected with an upper end of a connecting rod 45 slidably accommodated within the vertical bore 42 for movement therewith, the other lower end of which is formed with a movable cutter element 45*a* having a blade edge 45*b* and also with a notch 45*c*. Within the notch 45*c*, a retainer block 46 for retaining firmly in position any one of the capacitors 10 to be cut away from their supporter base, which consists of the sheet member and the adhesive tape 12 bonded thereto as shown in FIG. 2, is accommodated while a compression spring 47 is interposed between said retainer block 46 and the lower end of the connecting rod 45 for urging said retainer block 46 in the downward direction. Although the retainer block 46 is downwardly urged by the compression spring 47 as hereinbefore described, separation of these members 46 and 47 is prevented by a pin member 48 having one end rigidly connected with said block 46 and the other end accommodated in a vertical slot 45*d* formed in the cutter member 45*a* and extending substantially at right angles to the longitudinal axis of the vertical bore 42. The vertical slot 45*d* formed in the cutter member 45*a* also serves to restrict the stroke of relative movement of either the connecting rod 45 or the retainer block 46 in a manner as will become apparent from the subsequent description.

In cooperative relation to the cutter element 45*a* integral with the connecting rod 45 operable by the cylinder 43 through the plunger 43*a*, a fixed blade 49 is rigidly secured on one side of the guide rail 39 just below the blade edge 45*b* of the cutter element 45*a*.

In operation, assuming that the component substrate CS is guided along the guide rail 39 with the supporter base, which consists of the sheet member and the adhesive tape securing the leads of the capacitors 10 on the sheet member, laying in the groove 39*a* and the capacitors 10 situated outside, the cylinder 43 is operated when the electromagnets 28*a* and 29*a* of a pair are both inenergized to release the engagement between the pinch rollers 28*e* and 29*e* and the drive rollers 26 and 27, respectively, through the component substrate thereby permitting the latter to stop on the guide rail 39. As the cylinder 43 is operated, the plunger 43*a* is extended and the connecting rod 45 downwardly moves accompanying a corresponding downward movement of the retainer block 46 without compressing the compression spring 47. The spring 47 is first compressed upon abutment of the retainer block 46 against the portion of the guide rail 39 with portions of a pair of leads 11 between the body of the associated capacitor 10 and the supporter base firmly held in position between the retainer block 46 and the portion of the guide rail 39 and, subsequently, the cutter element 45*a* descends against the compression spring 47 with the result that the blade edge 45*b* of said cutter element 45a cuts the capacitor off from its supporter base in cooperation with the fixed blade 49. Thereafter, the cylinder 43 is brought to an inoperative position while the capacitor 10 thus cut away from its supporter base can fall by gravity on to the feeder unit through an opening 8*a* formed in the table 8 at a position immediately below said cutter 40.

Any one of the component substrates which has been consumed, that is, any one of the supporter bases from which all of the capacitors 10 have been cut away , is then fed to a waste box (not shown) disposed frontwardly of the table 8.

FEEDER UNIT

The feeder unit 4 comprises a pair of opposed endless belt conveyances, only one of which is shown by 50 in FIG. 1, for transporting the capacitor separated from its supporter base by means of the associated cutter 40 on to a funnel 51. Since the funnel 51 is disposed intermediate of the table 8 below the level of the table 8, the endless belts of these endless belt conveyances 50 run in the opposed directions with respect to each other.

As shown in FIG. 4, each of the conveyances 50 comprises a pair of drive and driven wheels 50*a* and 50*b* and an endless belt 50*c* operatively suspended between the drive and driven wheels 50*a* and 50*b*. Although the drive wheels 50*a* of the opposed conveyances 50 may be operatively connected with the motor 32 through a suitable gear arrangement, a separate motor 50*d* is provided in this embodiment and has a motor shaft 50*e* rigidly mounted with a pulley 50*f*. The pulley 50*f* on the motor shaft 50*e* is connected through an endless belt with a driven pulley 50*g*, rigidly mounted on a shaft carrying either of the drive wheels 50*a*, for rotating said drive wheel 50 in one predetermined direction and also with a driven pulley 50*h*, rigidly mounted on a shaft carrying the other drive wheel 50*a*, through an intermediate pulley (not shown) by means of a pair of endless belts, for rotating said other drive wheel 50*a* in the direction counter to the rotational direction of said one of said drive wheels 50*a*. Thus, it is clear that the endless belts 50*c* on both sides of the funnel 51 run in the opposed directions with respect to each other.

The feeder unit 4 further comprises an automatic attitude control generally indicated by 53 in FIGS. 11 and 12 for correcting the attitude of the capacitor fed from the cutter unit 3 by means of either of the opposed conveyances 50, in such a way that the leads 11 of the capacitor 10 are downwardly oriented with the capacitor 10 itself oriented upwards with respect to the downward path of travel of each one of the capacitors.

Referring now to FIG. 11 to FIG. 15, the details of the attitude control 53 will be now described. As shown, the capacitors received one after another by the funnel 51 are fed to the retainer unit 5 after passing through a first chute 52*a*, then the attitude control 53 and finally a second chute 52*b*. Although the capacitors fed one after another from any one of the cutters 40 of the cutter unit 3 into the funnel 51 after transported by either of the opposed conveyances 50 downwardly slide by gravity while guided along the first chute 52*a* to the attitude control 53 in an arbitrary attitude, each one of the capacitors downwardly sliding in the second chute 52*b* after passing through the attitude control 53 must be conditioned such that a pair of leads 11 substantially parallely extending from the body of the capacitor 10 are downwardly oriented with the body of said capacitor positioned upwardly of said leads. (The cpaacitor so conditioned is hereinafter referred to as "standing capacitor" while the capacitor conditioned to the contrary is referred to as "reversed capacitor.") To this end, the attitude control 53 is provided as interposed between the first and second chutes 52*a* and 52*b*.

This attitude control 53 comprises a solid block 54 formed with a pair of large and small diameter bores 54*a* and 54*b* each of which has a configuration as shown in FIG. 12 and extends across the thickness of said block 54. The large diameter bore 54a rotatably accommodates therein a large diameter rotor of an outer diameter substantially equal to the diameter of the bore 54*a* having one end face laying in the same plane as that of the corresponding surface of the solid block 54 and the other end face integrally formed with a stud member 55*a* extending rearwardly therefrom which is in turn mounted with a gear 56. The rotor 55 as well as the stud member 55*a* is formed with a through hole 55*c* extending in alignment with the longitudinal axis thereof, in which a slidable inverter of the construction as will be described with reference to FIG. 13 is accommodated.

This large diameter rotor 55 is formed on said one end face thereof with a groove 55*b* diametrically extending across the centrally disposed through hole 55*c* and having a cross section substantially the same as that of either of the first and second chutes 52*a* and 52*b*.

Within the small diameter bore 54*b*, a small diameter rotor 57 of a diameter substantially equal to that of the bore 54*b* is rotatably accommodated, which has one end face laying in the same plane as that of the corresponding surface of the solid block 54 and the other end face integrally formed with a stud member 57*a* extending rearwardly therefrom in parallel with the stud member 55*a* of the large diameter rotor 55. The stud member 57*a* of the small diameter rotor 57 is mounted at a substantially intermediate portion with a gear 58 in constantly meshed relation with the gear 56 on the stud member 55*a* of the rotor 55, an outer end extremity thereof extending through a covering plate 59, secured to the opposite surface of the solid block 54 in any suitable method, and then connected with a drive shaft (not shown) of an electrically operated motor 60. As shown in FIG. 11, the outer end face of the rotor 57 is formed with a substantially U-shaped groove 57 so sized as to accommodate therein the capacitor or like component to be utilized in the component mounting apparatus of the present invention. Similarly, the U-shaped groove 57*b* has a cross section substantially the same as that of either of the first and second chutes 52*a* and 52*b* and, hence, that of the groove 55*b* formed in the large diameter rotor 55.

While the rotors 55 and 57 are each constructed hereinabove described, the large diameter rotor 55 is normally conditioned such that a pair of open ends of the groove 55*b* are respectively aligned with grooves 54*c* and 54*d* formed in the surface of the solid block 54, thereby forming a continuous passage for the capacitors. (However, as will be described later, this continuous passage is blocked by the slidable inverter.) Likewise, the small diameter rotor 57 is normally conditioned such that an open end of the U-shaped groove 57*b* is downwardly oriented and aligned with a groove 54*e*, formed in the surface of the solid block 54, which is in turn aligned with the second chute 52*b*. Either of the rotors 55 and 57 is designed so as to rotate only through 180° for the reason as will become apparent later. To achieve this, at least a pair of stoppers, which are angularly spaced 180° with respect to each other, may be employed in any suitable manner. Alternatively, the motor 60 may be employed in the form of a motor rotatable through 180° in the opposite directions.

Reference numeral 59*a* indicates a front covering plate preferably made of transparent material and secured to the surface of the solid block 54 in any suitable method for overlaying the passage elements such as indicated by 54*c*, 55*b*, 54*d*, 57*b* and 54*e*.

Referring now to FIGS. 12 and 13, the slidable inverter is shown in the form of a round bar and generally indicated by 61. As hereinbefore described, this inverter bar 61 is slidably accommodated in the through hole 55*c*, but rotatable together with the large diameter rotor 55. The inverter bar 61 is formed at a substantially intermediate portion thereof with a slot 61*a* extending transversely of the longitudinal direction of said bar 61, in which a pin member 62 having the both ends rigidly connected with the stud member 55*a* of the rotor 55 extends so as to transmit a rotational force of the rotor 55 to the inverter bar 61. On the other hand, the inverter bar 61 is also formed at one end with a movable iron rod 63, whch may be integral therewith, operatively housed within a solenoid assembly 64, whereby, when the solenoid assembly is operated, the inverter bar 61 is moved to the left as viewed from FIG. 12 against a compression spring 65 and, when the solenoid assembly is in the inoperative position, the inverter bar 61 is biased to the right by the action of the compression spring 65. The stroke of sliding movement of the inverter bar 61 is limited by the pin member 62 in cooperation with the slot 61*a*, the latter being so sized that the other end portion of said inverter bar 61 can be projected in a distance substantially equal to the depth of the groove 55*b* formed in the end face of the large diameter rotor 55.

The details of the other end portion of said inverter bar 61 is clearly illustrated in FIG. 13. As shown, the other, or front, end portion of the inverter bar 61 is formed with a pair of upright fins 61*b* and 61*c* rigidly accommodated in a semi-circular notch 61*d* formed therearound with a straight edge member 61*e* left between said notch 61*d* and the end extremity of said inverter bar. It is to be noted that an upper straight edge of the edge member 61*e* is inclined inwardly of said notch 61*d* for providing a guide to the capacitor to be supported by said shaped end portion of said inverter bar 61.

The arrangement of the shaped end portion of said inverter bar 61 is such that, when the standing capacitor sliding from the funnel 51 falls on the shaped end portion of the inverter bar 61, the capacitor is conditioned such as shown in FIG. 14 with a pair of the leads 11 received by the depth of the semi-circular notch 61*d* and the body of the capacitor straddling over between the fins 61*b* and 61*c* while, when the reversed capacitor sliding from the funnel 51 falls on the shaped end portion of the inverter bar 61, the capacitor is conditioned such as shown in FIG. 15 with the body of said capacitor resting on upper edges of the spaced fins 61*b* and 61*c* and the leads 11 upwardly oriented.

Although not shown, a photoelectric detector is in practice provided for operating the solenoid assembly 64 in a delayed manner in response to the entry of the capacitor into the groove 55*b* of the large diameter rotor 55 from the groove 54*c*. In this case, the photoelectric detector is preferably comprised of a photocell and a suitable light source arranged so as to transmit a beam of light to said photo cell across the groove 54*c* formed in the solid block 54. The motor 60 may be electrically connected with the solenoid assembly 64 through a suitable delay line (not shown) so that, upon completion of a retracting movement of the inverter bar 61 in the leftward direction as viewed from FIG. 12, the motor 60 is operated so as to rotate the rotor 57 and synchronously the rotor 55 accompanying the corresponding rotation of the inverter bar 61.

As shown in FIG. 12, bearing sleeves 66a and 66b may be mounted on the respective stud members 55a and 57a for facilitating a smooth rotation thereof.

The attitude control 53 of the above construction functions in the following manner. Assuming that the capacitor downwardly sliding from the funnel 51 is upstanding and upon the establishment of the condition shown in FIG. 14, the solenoid assembly 64 is first operated. As the solenoid assembly 64 is operated, the inverter bar 61 commences to backeardly retract and the leads of the standing capacitor, which are received in the semi-circular notch 61d, are finally sandwiched between the upper edge of the edge member 61e and the peripheral edge of the through hole 55c of the rotor 55. As soon as the inverter bar 61 completes its backward movement effected by the solenoid assembly 64, the motor 60 is operated in response thereto for rotating the rotor 57 and the rotor 55 simultaneously therewith in one direction through 180°. At this time, the inverter bar 61 carrying the standing capacitor in the manner as hereinabove described is also rotated accompanied by the rotation of the rotor 55 without said capacitor falling from the shaped end portion of said bar 61.

At the time the rotors 55 and 57 complete their respective 180° rotation in one direction, the capacitor carried by the inverter bar 61 become reversed while the open end of the substantially U-shaped groove 57b in the rotor 57 becomes registered with the groove 54d. However, upon completion of 180° rotation of these rotors, the solenoid assembly 64 can be brought to the inoperative position whereby the inverter bar 61 is projected with the capacitor, then reversed in posture, leaving therefrom by gravity and further downwardly slding on to the U-shaped groove 57b through the groove 54d. Immediately after the capacitor falls in the U-shaped groove 57b of the rotor 57 in a reversed attitude, the motor is again operated to rotate the rotors 55 and 57 in the opposite or reverse direction to establish the initial condition. Upon establishment of this initial condition, the capacitor within the groove 57b begins to fall by gravity on to the second chute 52b through the groove 54e.

On the other hand, assuming that the capacitor downwardly sliding from the funnel 51 is reversed in posture and upon establishment of the condition shown in FIG. 15, the solenoid assembly 64 is first operated to retract the inverter bar 61. As the inverter bar 61 is retracted, the body of the capacitor resting on the upper edges of the fins 61b and 61c is swept by the peripheral edge of the through hole 55c and then falls by gravity on to the groove 54d without being sandwiched between said peripheral edge of the through hole 55c and the edge member 61e. The capacitor within the groove 54d falls by gravity on to the U-shaped groove 57b only when the motor 60 is reversely rotated with the result that the open end of said groove 57b becomes registered with the groove 54d. Thus, the capacitor fed from the U-shaped groove to the groove 54e assumes the same attitude as hereinbefore described. It is to be noted that, although the capacitor after passing through the groove 55b of the rotor 55 abuts against the peripheral wall of the rotor 57 while staying within the groove 54d, upon retraction of 60 inverter bar 61, the motor 50 is reversely rotated so that, while the rotor 55 rotates idle, the rotor 57 can be conditioned such as to register the open end of the groove 57b with the groove 54d for permitting the capacitor with the groove 54d to enter the groove 57b.

From the foregoing, it has now become clear that, irrespective of the attitude of the capacitors fed one after another to the groove 54c from the funnel 51, the attitude of each one of the same capacitors downwardly sliding through the groove 54e has been controlled by the attitude control 53 such that the body of the capacitor is oriented upwards with the pair of leads downwardly directed, i.e., the capacitor itself assumes in an upstanding posture.

RETAINER UNIT

The retainer unit 5 acts to receive the capacitor fed through the groove 54e and then the second chute 52b of the feeder unit 4 and then to deliver it to the component inserting unit 6 after enlarging the tip-to-tip distance of the leads of the capacitor to a predetermined value. This retainer unit 5 is supported by the attitude control 53 through a guide platform 70 connected to a lower end projection 54f (FIG. 11) of the solid block 54 by the use of suitable fastening members such as set screws or bolts and nuts.

As shown in FIGS. 11 and 16 through 20, a slidable strip 71 is slidably mounted on the platform 70 and has one end loosely supporting a normally retracted plunger 72a of a hydraulically operated cylinder 72 which is supported by the corresponding end of the platform as at 70a, and the other end formed with a pair of bearing pieces 71a as shown in FIG. 19. A saddle-like member 73 having a continuously curved groove 73a extending over the both sides thereof is pivotally supported by the pair of the bearing pieces 71a by means of a spindle 73b extending therebetween across the saddle-like member 73 and normally biased by a coiled spring 73c about the spindle 73b so as to stand vertically as shown in FIG. 20. However, so long as the plunger 72a of the cylinder 72 is retracted and, hence, the slidable strip 71 is brought to a retracted position as will be mentioned later, a lower end of the saddle-like member 73 is biased about the spindle 73b against the coiled spring 73c so as to align with the second chute 52b for receiving the capacitor fed through the second chute 52b as shown in FIG. 18.

The slidable strip 71 is formed on its upper surface with an upright stopper 71b suitably spaced from the upright end of said strip 71 which loosely carries the plunger 72a. The slidable strip 71 can slide on the platform 70 in the leftword direction as viewed from FIG. 11 or FIG. 16 only when the plunger 72a in the course of being extended abuts against said stopper 71b and, as the strip 71 is moved in the manner as hereinbefore described, the condition shown in FIG. 20 can beestablished.

The free end extremity of the plunger 72a situated substantially between the upright end of the strip 71 and the upright stopper 71b is rigidly mounted with a plate member 74.

A substantially triangular shaped plate member 75 having a hammering finger 75a for hammering the capacitor, that has been fed to the saddle-like member 73 and riding on said member 73 with the leads engaged in the groove 73a, so as to be firmly caught by said saddle-like member 73, is pivotally supported by a pin 76 having one end rigidly mounted with said triangular shaped plate member 75 and the other end rotatably carried by a supporting column 77 integrally projected from the lower end of the second chute 52*b*. The pin 76 for supporting the triangular plate member 75 is rigidly mounted with a connecting lever 78 which is in turn pivotally connected with a drive shaft 79 through a bracket 80.

As shown in FIG. 16, the drive shaft 79 has one end rigidly mounted with a plate member 81 which carries an adjustable bolt 82 having one end rigidly secured to said plate member 81 and the other end adapted to abut against the plate member 74 mounted on the free end extremity of the plunger 72*a* of the cylinder 72. The other end portion of said drive shaft 79 is loosely mounted with a compression spring 83 for biasing said drive shaft 79 in one predetermined direction toward the left as viewed from FIG. 11 or FIG. 16, whereby the other end of the adjustable bolt 82 is abutted against the plate member 74. This drive shaft 79 moves to the left by the action of the compression spring 83 so as to rotate the triangular plate member 75 in such a way as to cause the hammering finger 75*a* to strike the body of the capacitor overriding the saddlelike member 73, as shown in FIG. 18, only when the plunger 72*a* of the cylinder 72 is projected. It is to be noted that the hammering action of the finger 75*a* of the triangular plate member 75 completes prior to or at the same time the free end extremity of the plunger 72*a* abuts against the upright stopper 71*b* on the slidable strip 71. At the time the triangular shaped plate member 75 is conditioned such as shown in FIG. 18, further leftward movement of the drive shaft 79 is restricted by the engagement between the plate member 81 and the lower end projection 54*f* of the solid block 54 of the attitude control 53 without disturbing the further movement of the plunger 72*a* of the cylinder 72.

Reference numeral 84 indicate a screw stopper for restricting the stroke of movement of the slidable strip 71 in cooperation with an inwardly formed recess 71*c* formed on the bottom surface thereof facint toward the platform 70. Reference numeral 85 indicates an adjustment bolt for adjusting the initial position of the slidable strip 71 in which condition of saddle-like member 73 must be aligned with the opening of the second chute 52*b* so as to receive the capacitor sliding by gravity therethrough on to said saddle-like member 73.

With reference to FIG. 17, a manner in which the slidable strip 71 is slidably mounted on the platform 70 will be now described. With in mind that FIG. 17 show the cross section taken along the line XVII—XVII in FIG. 11, the platform 71 is of a channel shaped cross section having a cavity of a sufficient size enough to slidably accommodate therein the slidable strip 71. For preventing a possible separation of the slidable strip 71 from the cavity of the platform 70, a pair of elongated plates, generally indicated by 86 is mounted on respective upright walls 70*b* and 70*c* which defines the cavity of the platform 70 in cooperation with the bottom 70*d*. As shown, the strip 71 is formed with a blind hole 71*d* extending in the widthwise direction and accommodating therein a ball member 87 and a compression spring 88. The ball member 87 is normally biased by the compression spring 88 interposed between it and the depth of the blind hole 71*d*, whereby a sufficient friction is exerted between the strip 71 and the guide platform 70. This friction is effective to prevent the strip 71 from arbitrarily moving along the cavity of the guide platform 70.

In operation, so long as the cylinder 72 is not operated with the plunger 72*a* in the retracted position, the various parts of the retainer unit 5 is conditioned substantially as shown in FIG. 11 and FIG. 16. The capacitor, of which the attitude has been corrected by the attitude control 53 and which downwardly slides in the second chute 52*b*, is restricted by a stopper portion 75*b* of the triangular plate member 75 with the pair of leads 11 of said capacitor ready to engage in the groove 73*a* on the saddle-like member 73. However, the cylinder 72 is operated upon receipt of an electro-mechanical signal fed from a suitable photoelectric detector which is indicative of the passage of the capacitor through the second chute 52*b*. Upon operation of the clyinder 72, the plunger 72*a* thereof is forwardly projected accompanying the corresponding movement of the plate member 74 rigidly mounted thereon. As the plate member 74 moves in the manner as hereinabove described, the drive shaft 79 is moved by the action of the compression spring 83 with the free end of the adjustment bolt 82 constantly in contact with the plate member 74. Since this movement of the plunger 72*a* and hence the drive shaft 70 takes place in a reasonably rapid manner, the triangular shaped plate member 75 can be pivoted about the spindle 75 thus clearing the stopper portion 75*b* thereof off from the capacitor while permitting the hammering finger 75*a* to strike the capcitor from above thereby to mount the capacitor firmly on the saddle-like member 73. Thereafter the free end extremity of the plunger 72*a* during its forward movement abuts against the upright stopper 71b on the slidable strip 71 thereby pushing the latter in the corresponding direction. At the time that the forward movement of the plunger 72*a* of the cylinder 72 completes, the saddle-like member 73 stands vertically as shown in FIG. 20 by the action of the coiled spring 73*c* and the capacitor mounted on said member 73 is positioned just below the component inserting unit 6 as will become understood from a description made in connection with said unit 6.

After the capacitor mounted on the saddle-like member 73 thus positioned below the unit 6 has been picked up in a manner as will be mentioned later, the cylinder 72 can be brought to an inoperative position with the plunger 72*b* returned to the retracted position. During the return movement of the plunger 72*b*, it is clear that plate member 74 backeardly pulls not only the slidable strip 71, but also the drive shaft 70, to their respective original positions. It is also clear that, as the drive shaft 79 is returned to the original position in response to the retracting movement of the plunger 72*a*, the substantially triangular shaped plate member 75 pivots about the spindle 76 in the opposite direction such that the stopper portion 75*b* thereof is brought to a position ready to restrict the subsequent capacitor passing through the second chute 52*b*, the condition being substantially shown in FIG. 11.

COMPONENT INSERTING UNIT

With reference to FIGS. 21 to 23, the component inserting unit 6 comprises a pair of opposed lead guides 90 each rigidly secured to a camming piece 91 pivotally supported by an outer hollow shaft 92. Adjustment screws 93 threadably inserted in respective fitting pieces 92*a* secured to the outer hollow shaft 92 are provided so that, by turning said adjustment screws in the opposite directions, the opening of the lead guides 90, i.e., the tip-to-tip distance between said lead guides 90, can be adjusted. The both camming pieces 91 are normally biased in the opposed directions toward the respective adjustment screws 93 by means of spring members (not shown) having a preferably small resiliency.

The outer hollow shaft 92 is rotatably and slidably supported by a bearing block 94 suitably secured to a bottom plate 95 of the inserting unit framework 96.

Reference numeral 96 indicates a pair of opposed nippers 96 each having a lower free end provided with a cushioning member 97, substantially intermediate portions of said nippers 96 being pivotally connected with a pin 98 while intersecting with respect to each other. These nippers 96 have respective upper ends pivotally connected with link members 99 by means of pins 100, which are in turn pivotally connected with a common center pin 101 by means of a pin 102, said center pin 101 being vertically slidably accommodated within the hollow of an inner hollow shaft 103 and normally upwardly biased by a compression spring 104. In this arrangement, if the center pin 101 is downwardly pressed against the compression spring 104 in a manner which will be mentioned later, the lower free ends of said respective nippers 96 open with respect to each other so that the capacitor mounted on the saddle-like member 73 carried by the slidable strip 71 in its projected position can be ready to be picked up by said lower free ends of said nippers 96. Of course, so long as no external pushing force is applied to the center pin 101 for causing the latter to downwardly move against the compression spring 104, the center pin 101 is maintained in an upwardly shifted position by said compression spring 104 with the lower free ends of said nippers 96 being closed with respect to each other. Variation of the distance between the pins 100 which takes place as the center pin 101 is vertically moved is accommodated by a pair of opposed grooves 105 formed in the inner hollow shaft 103 without disturbing the movement of each one of the link members 99.

Reference numeral 106 indicates a movable block rotatably mounted on the outer hollow shaft 92 and held in position between a radially outwardly extending flange **92*a* of the outer hollow shaft 92 and a stopper ring 107 rigidly mounted on said hollow shaft 92 through a collar 108 inter posed between said stopper ring 107 and said block 106. As shown, a pair of guide posts 109 are connected with said movable block 106 in such a way that, while upper ends of said respective guide posts 109 are each upwardly exposed to the outside, the other lower ends thereof slidably extend through bearings 110, which are respectively inserted in holes formed in an upper plate 111, and rigidly mounted on said movable block 106. It is clear that downward movement of the outer hollow shaft 92 accompanies the corresponding movement of the movable block 106 and hence the pair of said guide posts 109 guided by the respective bearings 110**.

A pair of spacer pieces 112 are rigidly mounted on the movable block 106, between which a leaf spring 113 is elastically collapsibly bridged as shown. This leaf spring 113 has a substantialy intermediate portion rigidly connected with a detent piece 114 elastically engaged with a lateral projection 115 formed on both sides of the inner hollow shaft 103 and extending laterally of the longitudinal axis of said inner hollow shaft 103. The engagement between the detent piece 114 and the lateral projection 115 is effective to prevent the inner hollow shaft 103 from arbitrarily rotating about its own axis. In other words, with this engagement between the detent piece 114 and the lateral projection 115 formed in the inner hollow shaft 103, rotation of either the inner hollow shaft 103 or the outer hollow shaft 92 about its own axis can be transmitted to the other for permitting the both shafts 103 and 92 to rotate in the same direction through the same angle of rotation so long as such engagement is maintained.

A hydraulically operated cylinder 116 having a plunger 116a movable between retracted and extended positions is firmly supported by the movable block 106 by means of a bracket 117. An upper open end of the inner hollow shaft 103 is closed by a closure 118 and a free end of said plunger 116a of said cylinder 116 extends slidably through a hole formed in said closure 118 and rigidly mounted with a sleeve 119. A compression spring 120 is interposed between the cylinder 116 and the closure 118 around the plunger **116*a* for downwardly urging said inner hollow shaft 103. As clearly shown, so long as the plunger 116a is in the retracted position, the downward movement of the inner hollow shaft 103 is restricted by the sleeve 119 mounted on the free end of said plunger 116*a* in contact with the interior surface of the closure 118**.

The hydraulically operated cylinder 116 is, as will be understood later, utilized to operate the inner hollow shaft 104 as well as the center pin 101. For operating the inner and outer hollow shafts 103 and 92 and the movable block 106, another hydraulically operated cylinder 121 is provided as having a plunger operatively connected wuth the movable block 106.

For rotating the outer hollow shaft 92, a torque motor 122 is provided as having a drive shaft **122*a* mounted with a gear 123 in constantly meshed relation with a driven gear 124 non-rotatably mounted on the otuer hollow shaft 92. The manner in which the driven gear 124 is mounted on the outer hollow shaft 92 is such that a key integrally inwardly projecting from the inner peripheral surface of said gear 124 of a substantially ring-shape is slidably engaged in a key-way 92*b* formed on the outer periphery of said shaft 92 in parallel to the longitudinal axis of said outer hollow shaft 92. Because of this key-and-keyway engagement, rotation of the driven gear 124 caused by the motor 122 through the drive gear 123 can be effectively transmitted to the hollow shaft 92** for rotating the latter in either direction.

The outer hollow shaft 92 can be rotated from its original position selectively through first and second predetermined angles of rotation preferably spaced 90° apart from each other. To this end, the drive gear 123 is formed on its undersurface with an engagement 123a which cooperates with a stopper 125 secured on the bottom plate 95 for defining the angle of rotation of said drive gear 123 and hence the outer hollow shaft 92. When the drive gear 123 is rotated until the engagement **123*a* abuts against the stopper 125 from the outer side, the outer hollow shaft 92 is assumed as rotated through the first predetermined angle of rotation. Rotation of the outer hollow shaft 92 through the second predetermined angle of rotation is then defined by an interrupter 126 operable by an electrical solenoid 127 in such a manner that, when said solenoid is energized, said interrupter 126 is brought to a position ready to engage with the engagement 123*a* as the latter approaches thereto and, when said solenoid is not energized, said interrupter 136 clears of the path of travel of said engagement 123***a*.

Figure 25:
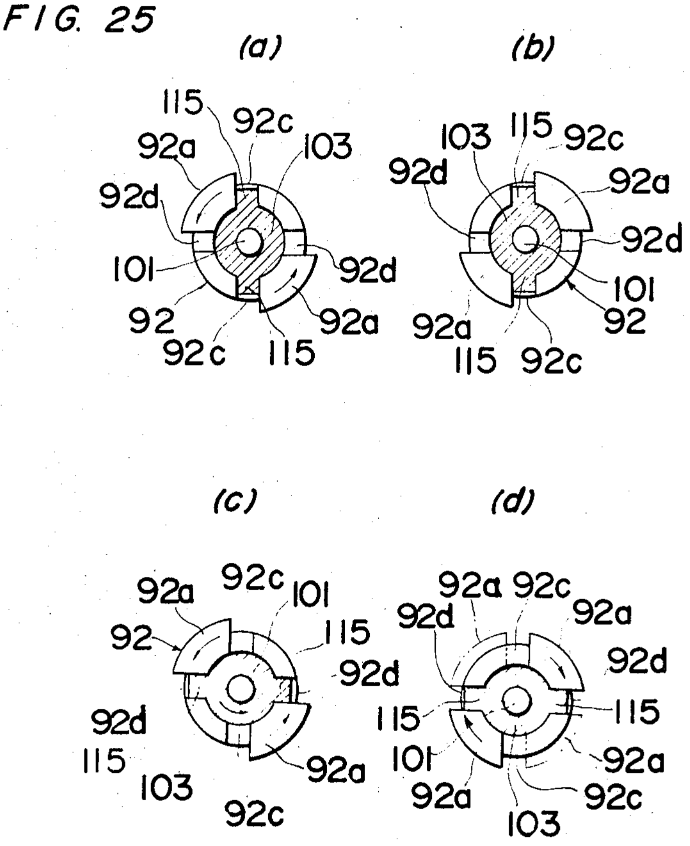

As shown in FIG. 22 and FIG. 25, the outer hollow shaft 92 is formed on its upper open end portion with two pairs of opposed recesses 92*c* and 92*d*, said recesses of said two pairs being spaced 90° apart from each other and having different depths. These pairs of the recesses 92*c* and 92*d* act to selectively receive therein the opposed lateral projections 115 for restricting the stroke of downward movement of the inner hollow shaft 103.

In operation, it is assumed that, so long as the cylinders 116 and 121 are not operated, the various movable elements of the component inserting unit are conditioned such as shown in FIGS. 21 and 22 and FIG. 26(*a*). While in this condition, if the cylinder 116 is operated to extend the plunger 116*a*, the inner hollow shaft 103 commences to descend by the action of the compression spring 120, accompanying the corresponding downward movement of the nippers 96. This downward movement of the inner hollow shaft 103 continues until the lateral projections 115 of said inner hollow shaft 103 are respectively received in the opposed recesses 92*c* on the upper open end of the outer hollow shaft 92. However, the cylinder 116 continues to operate so as to extend the plunger 116*a* and, as said plunger 116*a* is further extended, the sleeve 119 mounted on the free end of said plunger 116*a* abuts against the top end of the center pin 101 causing the latter to downwardly move against the compression spring 104 as the plunger 116*a* extends.

As the center pin 101 is downwardly moved in the manner as hereinabove described, the links 99 expands in the opposed directions away from each other about the common pin 102 causing the free ends of the nippers 96 to open with respect to each other. This conditino is clearly illustrated in FIG. 26(*b*). Subsequently, the cylinder 82 of the retainer unit 5 is operated and the saddle-like member 73 carrying the capacitor thereon is, in the manner as hereinbefore fully described in connection with the retainer unit 5, brought to a position ready to be nipped by the nippers 96 as shown in FIG. 26(*b*). Thereafter, the cylinder 116 is reversely operated to retract the plunger 116*a* and, as the plunger 116a retracts, the center pin 101 is upwardly moved by the compression spring 104. Prior to completion of the upward movement of the center pin 101 by the action of the compression spring 104, the free ends of the nippers 96 are closed to each other while the body of the capacitor is sandwiched therebetween. Since the free ends of the nippers 96 are respectively provided with cushioning members 97 of elastic material, no damage will be imparted to the capacitor.

As the plunger 116*a* of the clyuinder 116 is further retracted, the sleeve 119 abuts against the closure 118 from inside so that the inner hollow shaft 103 can be upwardly shifted against the compression spring 120 to the original position. It is to be noted that, during the upward movement of the inner hollow shaft 103 from the downwardly shifted position to the upwardly shifted position, the saddle-like member 73 carried by the slidable strip 71 returns to its original position. The condition in which the inner hollow shaft 103 as well as the nippers 96 is returned to the original position with the capacitor nipped thereby is clearly illustrated in FIG. 26(*c*).

After the condition shown in FIG. 26(c) has been established, the torque motor 122 is then operated to rotate the outer hollow shaft 92 in a manner as hereinafter described.

Assuming that the solenoid 127 is not operated with the interrupter 126 in position to restrict the angular travel of the engagement 123*a* of the drive gear 123, the drive gear 123 can be rotated by the motor 122 until the engagement 123*a* abuts against the interrupter 126. In other words, the outer hollow shaft 92 is rotated, for example, through 90° relative to the inner hollow shaft 103 by the engagement between the drive and driven gears 123 and 124. As the outer hollow sahft 92 is thus rotated, the opposed recesses 92*c* on the upper open end of the outer hollow shaft 92, that have been positioned immediately below the respective lateral projections 115 on the inner hollow shaft 103 as shown in FIG. 25(*a*), move out of alignment with said projections 115 while the opposed recesses 92*d*, spaced 90° apart from said recesses 92*c*, are brought into alignment with said projections 115 as shown in FIG. 25(*b*). During rotation of the outer hollow shaft 92, no rotation of the inner hollow shaft 103 take place because of the engagement of the detent member 114 with the projections 115 from above as shown in FIG. 22.

At the time the outer hollow shaft 92 is rotated through 90° in the manner as hereinbefore described, the lead guides 90 pivotally supported by the lower open end of the outer hollow shaft 92, which had been positioned in the plane intersecting to the body of the capacitor, are conditioned such as to receive and guide the respective leads of the capacitor with the capacitor ready to be mounted on a panel member 500 (FIG. 1) in a predetermined orientation. This predetermined orientation is hereinafter referred to as X orientation.

In the event that the capacitor is desired to be mounted in another Y orientation which may be angularly spaced 90° from the X orientation what is necessary is to operate the solenoid 127 thereby to permit the interrupter 126 to clear of the path of travel of said engagement 123*a* of the drive gear 123. If the solenoid 127 is thus operated, the engagement 123*a* of the drive gear 123 as the latter is rotated by the motor 122 rotates from one side of the stopper 125 to the other side of said stopper 125 without engaging with the interrupter 126. Thus, it is clear that the outer hollow shaft 92 is rotated through 180°.

While the first half of 180° rotation of the outer hollow shaft 92 gives the same result as hereinbefore described, during the latter half of said 180° rotation of said shaft 92, the collars 92*a* on the upper open end of the outer hollow shaft 92 abut against the associated lateral projections 115 so that rotation of the shaft 92 accompanies the corresponding rotation of the inner hollow shaft 103 against the resilient force exerted by the leaf spring 113 between the detent member 114 and the projections 115, thereby establishing the condition shown in FIG. 26(c) transferred from the condition of FIG. 26(*a*) through the condition of FIG. 26(*b*). Thus, it is clear that the capacitor nipped by the nippers 96 is ready to be mounted on the panel member 500 in the Y orientation with the pair of the leads guided by the lead guids 90.

From the foregoing, it has now become clear that the arrangement is designed such that not only the lead guides 90 and the nippers 96 are aligned with respect to each other, but also the mounting orientation can be selected as desired with respect to the panel member.

Since the depth of each one of the recesses 92*c* differs from that of each one of the recesses 92*d*, the stroke of downward movement of the inner hollow shaft 103 and hence the nippers 96 varies depending upon whether the nippers 96 functions to pick up the capacitor from the saddle-like member 73 or the nippers 96 functions to insert the picked capacitor on to the panel member 500 in a manner which will be described later.

When the inner hollow shaft 103 and hence the nippers 96 return to the original position after the inserting operation completes, the outer hollow shaft 92 is rotated in the reverse direction causing the collars 92a to abut against the corresponding projections 115 as shown in FIG. 25(*d*) and, thereafter, the outer hollow shaft 92 and the inner hollow shaft 103 rotate with the collars 92*a* in contact with the corresponding projections 115, thus establishing the condition as shown in FIG. 25(*a*). Upon return to the original position as hereinbefore described, the detent member 114 is again engaged with the projections 115.

It is clear that, when the capacitor picked by the nippers 96 is to be mounted on the panel member 500 with the leads inserted in holes of said panel member, the lead guides 90 and the nippers 96 are both conditioned such as shown in FIG. 26(*d*). With this in mind, if the cylinder 121 is subsequently operated to extend its plunger, the movement of said plunger of said cylinder 121 can be transmitted to the outer and inner hollow shafts 92 and 103 through the movable block 106, thus causing said shafts 92 and 103 to downwardly move. At the time the downward movement of the shafts 92 and 103 effected by the operation of the cylinder 121 completes, the lower end extremities of the respective lead guides 90 are substantially contacted with the surface of the panel member above respective holes 500*a* as shown in FIG. 26(*e*).

Thereafter, the cylinder 116 is again operated to extend the plunger 116*a* for causing the inner hollow shaft 103 to descend together with the nippers 96 until the lateral projections 115 engages in the opposed recesses 92*d* on the upper open end of the outer hollow shaft 92. At this time, during the downward movement of the inner hollow shaft 103 and correspondingly the nippers 96, the capacitor nipped by the lower free ends of said nippers 96 is mounted on the panel member 500 with the leads of said capacitor guided by the associated guides 90 on to the respective holes 500*a* of the panel member 500, thus establishing the condition shown in FIG. 26(*f*).

While the downward movement of the inner hollow shaft 103 is restricted by the opposed recesses 92*d* receiving therein the lateral projections 115, as the plunger 116*a* is further extended, the sleeve 119 abuts aginst the top end of the center pin 101 causing the latter to descend so that the lower free ends of the nippers 96 are opened away from each other to release the capacitor that has been nipped thereby.

As will be described in connection with the clincher unit with reference to FIGS. 27 through 31, as soon as the capacitor that has been nipped by the nippers 96 is released in the manner as hereinbefore described, the leads of the capacitor thus extending through the respective holes of the panel member 500 are clinched, as shown in either FIG. 29 or FIG. 31, to secure the capacitor on the panel member 500.

It is to be noted that each one of the lead guides 90 is of the construction as shown in FIG. 24. As shown, each one of the lead guides 90 is formed with a guide groove 90*a* which downwardly tapers for guiding the tip of the leads of the capacitor on to the hole. In addition, the inner hollow shaft 103 is formed at a portion adjacent to the lower end extremity thereof with laterally extending protrusions 103*a*, as shown in FIGS. 26(*d*) to (*g*), which are adapted to respectively engage with the camming members 91 only when the nippers 96 and the lead guides 90 are aligned with respect to each other. These laterally extending portrusions 103*a* function in such a manner that, during the component inserting operation, they sandwich the camming members 91 in cooperation with the adjustment screws 93, respectively, to firmly maintain the tip-to-tip distance of the lead guides 90 at a predetermined value and, after the component inserting operation has been over, no engagement between the lateral protrusions 103*a* and the camming members 91 take place as shown in FIG. 26(*f*) or FIG. 26(*g*).

After the component inserting operation completes and the cylinder 121 is reversed so as to retract the plunger, the movable block 106 is upwardly shifted accompanying the corresponding upward shaft of the inner and outer hollow shafts 103 and 92. At the time the upward shift of the movable block 106 completes, engagement between the lateral protrusions 103*a* of the inner hollow shaft 103 and the associated camming members 91 is released and, therefore, the lead guides 90 are free to pivot about the respective pins used to pivotally support the camming members 91 to the lower open end of the outer hollow shaft 92. In view of this, as the outer hollow shaft 92 as well as the inner hollow shaft 103 are upwardly moved in accordance withe the upward movement of the movable block 106, the lead guides 90 expand in the opposite directions as indicated by the arrows in FIG. 26(*g*) guided by the periphery of the body of the capacitor without pulling the latter off from the panel member 500.

Thereafter, the cylinder 116 is reversed to retract its plunger 116*a* for upwardly shifting the inner hollow shaft 103 in the manner as hereinbefore described and the torque motor 112 is then operated to return the inner and outer hollow shafts 103 and 92 to their respective original position, thus completing one cycle of operation of the component inserting unit.

From the forgoing, it has now become apparent that each one of the capacitors or electrical components having a pair of substantialy parallely extending leads can be effectively mounted on the panel member with the leads reliably inserted in the corresponding holes of the panel member. Furthermore, it is clear that, by adjusting the adjustment screws 93, the tip-to-tip distance of the lead guides 90 and, hence, the pitch between the leads of the capactitor, can be varied as desired.

CLINCHER UNIT

This clincher unit, although not shown in FIG. 1, is arranged below the lead guides 90 of the component inserting unit 6 while the panel member 500 supported by the positioning unit 7 is interposed therebetween as shown in FIG. 1. The details of this clincher unit will be described with reference to FIG. 27 through FIG. 31.

Referring first to FIG. 27, the clincher unit generally indicated by 150 comprises a base 151 stationarily supported in any suitable manner and having its undersurface integrally formed with a cylindrical column 151$a$ defining therein a hollow chamber 152 and its upper surface integrally formed with a cylindrical spacer 151$b$. A cylindrical piston 153 formed on its outer peripheral surface with an annular land 153$a$ having a groove in which a ring-shaped sealing 154 is received is slidably accommodated within the hollow chamber 152 with said sealing 154 in contact with the inner peripheral surface of said cylindrical column 151$a$. The cylindrical piston 153 has an upper open end accommodated within the cylindrical spacer 151$b$ and a portion adjacent to the other lower open end slidably mounted with a closure member 155 which is in turn fitted to the lower end extremity of the cylindrical column 151$a$ by means of a plurality of bolts 156. In this arrangement, it is to be noted that the hollow chamber 152 is divided into two working chambers 152$a$ and 152$b$ by the land 153$a$ of the cylindrical piston 153.

As shown, the closure member 155 is formed on its inner peripheral surface with a groove in which a ring-shaped sealing 157 is received for preventing communication between the second working chamber 152$b$ and the atmosphere through the opening of the closure member.

The first working chamber 152$a$ is communicated with the atmosphere through a discharge passage 158 and accommodated therein a compression spring 159 interposed between the undersurface of the base 151 and the land 153$a$ of the cylindrical piston 153 whereby the latter is normally downwardly urged. The second working chamber 152$b$ is communicated with a suitable air source through an inlet port 160 and then a passage 161, both formed in the cylindrical column 151$a$ as shown.

In the arrangement so far described, it is clear that, when fluid medium under pressure is supplied into the second working chamber 152$b$ through the port 160 and then the passage 161, the cylindrical piston 153$a$ can be upwardly shifted against the compression spring 159 with fluid medium contained in the first working chamber 152$a$ being discharged to the atmosphere through the passage 158, and it can be returned to the original position if the supply of fluid medium under pressure into the second working chamber 152$b$ ceases. As will be mentioned later, this cylindrical piston 153 is not only slidable vertically, but also rotatable about its longitudinal axis.

A carriage 162 having an upper end portion split into a pair of supporter strips 162$a$, only one of which is shown, and an lower end formed with a radially outwardly extending flange 162$b$ is accommodated within the hollow of the cylindrical piston 153 with said flange 162$b$ fixed to the annular end face of said piston 153 by means of a plurality of set screws 163 so that said carriage 162 can move together with said cylindrical piston 153.

The carriage 162 is formed therein with a cavity 164 and a bore 165 in coaxial relation to said cavity 164, said bore 165 having one end open to the atmosphere through the space between the supporter strips 162$a$ and the other end communicated with said cavity 164. This carriage 162 slidably carries therein a pusher rod 166 having an upper end 166$a$ formed into a conical shape, a portion adjacent to said concial end 166$a$ being slidably inserted in said bore 165, and a lower end formed with a collar 166$b$ slidably accommodated in the cavity 164. Naturally, the collar 166$b$ on the lower end of said pusher rod 166 is formed on its periphery with a groove for receiving therein a ring-shaped sealing 167 which slidably contacts the peripheral surface of the cavity 164.

The open end of the cavity 164 is closed by a plug 168 having a centrally disposed air inlet port 168$a$ and threadably inserted in the lower end of the carriage 162. In this arrangement, the cavity 164 is divided into two working chambers 164$a$ and 146$b$ by the collar 166$b$ of the pusher rod 166; the first working chamber 164$b$ accommodates therein a compression spring 169 for downwardly urging the pusher rod 166 and the second working chamber 164$b$ is communicated with a suitable air source through said air inlet port 168$a$ in said plug 168 so that, only when fluid medium under pressure is supplied into said second working chamber 164$b$, the pusher rod 166 can be upwardly shifted against the compression spring 169.

A ring gear 170 is mounted on a portion of the carriage adjacent to the open end of the bore 165 and above the upper annular edge of the cylindrical spacer 151$b$. As shown a portion of the outer peripheral surface of said carriage 162 is formed with a keyway 162$c$ extending in parallel relation to the longitudinal axis of said carriage, in which a bolt 171 threadably extending through the ring-shaped gear 170 is slidably received. This ring-shaped gear 170 is associated with a lack mechanism 172 which is in turn associated with a hydraulically operated cylinder 173 such that, when the cylinder 173 is operated, the lack mechanism 172 causes the gear 170 to rotate. However, since the gear 170 is engaged with the carriage through the bolt 171 slidably received in the keyway 162$c$, rotation of said gear 170 can be transmitted to the carriage 162 and the cylindrical piston 153 through the flange 162$b$. Furthermore, since the keyway 162$c$ has a sufficient length, no upward movement of the carriage 162 accompanies the corresponding movement of the ring-shaped gear 170.

Within the space defined between the supporter strips 162$a$, a pair of anvil members 174 each having an upper end shaped as shown in FIG. 28 or FIG. 30 and a lower end rotatably mounted with a roller 175 are pivotally supported by a pin member 176 extending between said strips a through said pair of said anvil members 174.

These anvil members 174 are normally urged by compression springs 177 such that the rollers 175 contact to each other while the shaped ends of said anvil members are separated from each other as shown in FIG. 27.

In operation, after the capacitor has been mounted on the panel member 500 with the leads thereof inserted through the holes 500$a$ of said panel member by the component inserting unit of the construction as hereinbefore fully described, if a line drawn between the leads of the capacitor mounted on the panel member does not align with a line drawn between the shaped ends of said anvil members 174, the cylinder 173 must be first operated to drive the gear 170 and hence the carriage 162 as well as the cylindrical piston 153 to condition the latter in the right angular position.

Fluid medium under pressure is then supplied into the second working chamber 152$b$ through the port 160 by means of the passage 161, causing the cylindrical piston 153 and hence the carriage 162 to be brought to the upwardly shifted position against the compression spring 159. It is to be noted that, when the upward movement of the carriage 162 completes, the shaped ends of the anvil members 174 carried by said carriage 162 are brought into the proximity of the undersurface of the panel member 500 with portions of the leads of the capacitor, which project beyond said panel member 500, accommodated within a space between said shaped ends of said anvil members 174.

While the carriage 162 is in the upwardly shifted position, fluid medium under pressure is subsequently supplied into the second working chamber 146b through the port 168*a* to bring said pusher rod 166 to an upwardly shifted position against the compression spring 169. As said pusher rod 166 moves to the upwardly shifted position in the manner as hereinabove described, the conical end 166*a* of said pusher rod 166 is pushed between the rollers 175, resulting in that said rollers 175 are pushed away from each other against the compression springs 177 acting to contact the rollers 175 to each other while the shaped ends of the anvil members 174 are abutted to each other with that portions of the leads firmly held therebetween. Since this process takes place in a rapid sequence, abutment of said shaped ends of said anvil members 174 to each other produces a sufficient impact enough to clinch that portions of the leads of the capacitor to fit with the shape of the shaped ends of said anvil members 174.

Thereafter, as the supply of fluid medium under pressure into the second working chamber 168*a* ceases, the pusher rod 166 is returned to the original position by the action of the compression spring 169 and, hence, the anvil members 174 to their respective original positions. Subsequently, the cylinder 173 is brought to an inoperative position, the gear 170 is rotated in the reverse direction to cause the carriage 162 as well as the cylindrical piston 153 to return to the original position, thus completing one cycle of operation of the clincher unit.

The details of each one of the shaped ends of the anvil members 174 will be now described with reference to FIGS. 28 through FIG. 31. If the shaped ends of the anvil members 174 are oppositely recesses as shown in FIG. 28, that portions of the leads of the capacitor projecting beyond the panel member 500 are oppositely curved, as clearly shown in front and sive views of FIG. 29(*a*) and (*b*) whereby no separation of the capacitor from the panel member is ensured. Likewise, if the shaped ends of the anvil members 174 are such that either of them is adapted to receive the other as shown in FIG. 30, that portions of the leads of the capacitor can be flattened as clearly shown in front and side views of FIG. 31(*a*) and (*b*). Even in this case, no separation of the capacitor from the panel member is ensured since the size of the flattened portion of each one of the leads of the capacitor becomes greater than the diameter of the holes 500*a* of the panel member 500.

As hereinbefore fully described, since the clincher unit is designed such that the portions of the leads of the capacitor projecting beyond the panel member are flattened or oppositely curved by the anvil members in the proximity of the undersurface of the panel member, no substantial contact between the anvil members and the panel member takes place. Therefore, the panel member can be advantageously prevented from being scratched by the anvil members. Furthermore, the capacitor mounted on the panel member with the leads shaped by the anvil members as hereinabove described can be advantageously held in position steadily and therefore, the subsequent clinching operation will not be disturbed by the previously mounted capacitor.

OTHER PREFERRED EMBODIMENTS

The other preferred embodiments shown in FIGS. 32 to 34, FIGS. 35 to 38 and FIGS. 39 to 41, are all directed to the attitude control 53 of the feeder unit 4. Therefore, like reference numerals employed in FIGS. 11 and 12 are utilized to designate like parts throughout FIGS. 32 to 41 for the sake of brevity.

Referring first to FIGS. 32 to 34, the slidable inverter bar 61 and its associated electrically operated solenoid assembly 64 and the hole 55*c* employed in the attitude control 53 of FIGS. 11 and 12 are omitted. Instead thereof, the rotor 55 is formed on the front end surface with a substantially circular groove 200 having both open ends 200*a* and 200*b* located in the vicinity of each other, one 200*a* of said open ends of the groove 200 being normally registered with the groove 54*c*. On the other hand, the rotor 57 is formed on the corresponding end face with a substantially U-shaped groove 57*b*′ having an opening of a width substantially equal to the sum of the widths of said open ends 200*a* and 200*b* of the groove 200 formed in the rotor 55.

The groove 200 is formed therein a projection as at 200*c* which is designed such as to restrict the passage of the capacitor entering from the open end 200*a* during the rotation of the rotor 55 if said capacitor is upstanding and to permit the passage of the same if the same is reversed in posutre. This is possible because, as shown in FIG. 34(*a*) to (*c*), if the upstanding capacitor enter the groove 200 through the open end 200*a* and the rotor 55 is rotated in the direction as indicated by the arrow in FIG. 32, the tip of either of the leads of the capacitor is engaged by the projection 200*c* within the groove 200 as shown in FIG. 34(*a*) and commences to rotate together with the rotor 55 without accompanying any relative motion as shown in FIG. 34(*b*). Of course, rotation of the rotor 55 is caused by the motor 66 through the gear 58 which rotates the rotor 57.

When the motor 60 has been operated to an extent that the enlarged opening of the groove 57*b*′ in the rotor 57 registers with the open ends of the groove 200 in the rotor 55 as shown in FIG. 34(*c*), the capacitor commences to fall by gravity on to the groove 57*b*′ in the rotor 57 through the open end 200*a* in such a manner that the body of the capacitor is downwardly oriented with the leads upside.

On the other hand, if the reversed capacitor enters the groove 200 through the open end 200*a* and the rotor 55 is rotated in the direction as indicated by the arrow in FIG. 32, the body of the capacitor passes over the projection 200*c* in the sequence of FIG. 34(*d*) to (*e*) since the height of the projection 200*c* is so small as to engage with the tip of the leads of the capacitor, but not to engage with the body of the capacitor. At the time the rotors 55 and 56 are conditioned such as shown in FIG. 34(*f*), the capacitor that has passed over the projection 200*c* commences to fall by gravity on to the groove 57*b*′ through the other end 200*b* in such a manner that body of said capacitor is downwardly oriented with the leads upside.

Nevertheless, if the motor 60 is reversely rotated afte the capacitor falls on to the groove 57*b*′ in the rotor 57, the same result as achieved by the attitude control of the foregoing embodiment can be obtained.

The embodiment shown in FIG. 35 to FIG. 38 is a modification of the embodiment shown in FIG. 32 to FIG. 34. In this embodiment, instead of the projection 200*c* formed in the groove 200 in the rotor 500 of the attitude control of FIGS. 32 to 34, means for clipping the leads of the capacitor passing through the groove 200 is provided. This clipping means comprises a shaped recess 300 formed on the outer side wall of the groove 200 in which a clipper element 301 is accommodated. This clipper element 301 is pivotally supported by the rotor 55 by means of a pin member 302 having one end rigidly mounted with said clipper element 301 and the other end rotatably crossing the thickness of the rotor 55 and rigidly mounted with a camming piece 303. The camming piece 303 is normally biased by a compression spring 304 causing the clipper element 301 to form a clearance 305 between a tapered end of said element 301 and an edge 200*d* in the groove 200.

As shown in FIG. 35, the bore 54*a* is formed on its depth with a segmential protrusion 305 over which the camming piece 303 can be slidingly guided as the rotor 55 is rotated in such a way that the clipper element 301 pivots about the pin member 302 so as to cause the tapered end thereof to engage with the edge 200*d*.

The operation of the attitude control according to this embodiment of FIG. 35 to FIG. 37 is similar to that of the control according to the embodiment of FIG. 32 to FIG. 34. The essential difference therebetween resides in that, according to the embodiment of FIGS. 35 to FIG. 37, at least one of the lead of the capacitor entering in the groove 200 through the open end 200*a* is trapped into the clearance between the tapered end of the clipper element 301 and the edge 200*d* and firmly sandwiched therebetween as the camming piece 303 slides over the protrusion 305 during the rotation of the rotor 55, substantially as shown in FIG. 38(*a*). In the event that the reversed capacitor enters in the groove 200, although the body of the capacitor may be blocked by the edge 200*d*, the capacitor can be releases from the edge 200*d*, without being sandwiched between the tapered end of the element 301 and said edge 200*d*, as the camming piece 303 slides over the protrusion 305 during the rotation of the rotor 55 thereby permitting the tapered end of the clipper element 301 to push the body of the capacitor away from the edge 200*d*.

From the foregoing, it is clear that this embodiment facilitates the use of electrical components of square or rectangular shape in association with the component mounting apparatus herein disclosed.

Figure 41B:
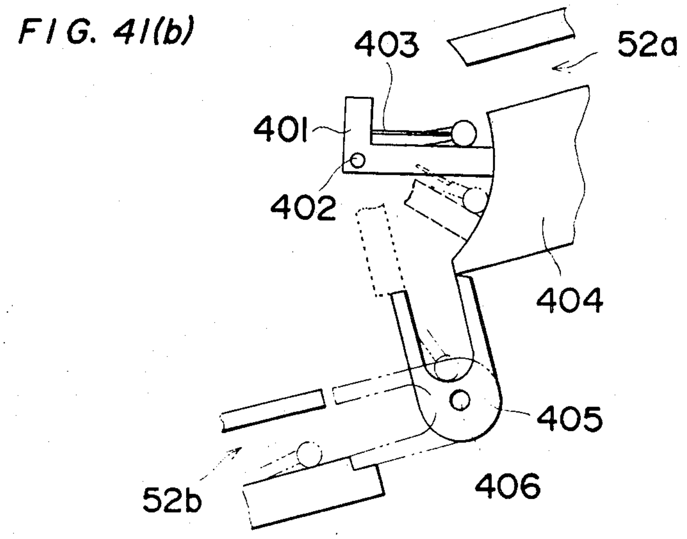

The attitude control 53 according to the embodiment of FIGS. 39 to 41 comprises a pair of spaced plates 400*a* and 400*b*, both of which are spaced by solid elements forming the respective chutes 52*a* and 52*b*. Within the space between said plates, there is a substantially L-shaped element 401 pivotally supported by a pin 402 having one end journalled by the plate 400*a* and the other end extending through the other plate 400*b* and connected with a rotary solenoid 60*a* so that, when said rotary solenoid 60*a* is operated, said L-shaped element 401 can be rotated. This L-shaped element 401 is formed with a short piece 401*a* carrying a thin plate 403 having one end rigidly connected with said short piece 401*a* and the other end oriented toward the chute 52*a*, and a long piece 401*b* extending in parallel relation to the thin plate 403 and slidably contacted with a curved edge 404*a* of a solid member 404 forming a part of the chute 52*a* so that, as said L-shaped element 401 is rotated by the rotary solenoid 60*a*, it rotates with the long piece 401*b* sludably guided along said curved edge 404*a* without forming a gap therebetween.

The space between the plates 400*a* and 400*b* also accommodate therein a substantially U-shaped element 405 rotatably supported therein by means of a pin 406 having one end journalled by the plate 400*a* and the other end extending through the other plate 400*b* and connected with another rotary solenoid 60*b*, said U-shaped element 405 being normally conditioned such as to receive therein the capacitor transported by the L-shaped element 401 in a manner as will be mentioned later. This U-shaped element can be rotated by the rotary solenoid 60*b* until the opening of a recess 405*a* of said U-shaped element 405 is registered with the chute 52*b*.

The operation of the attitude control 53 of this embodiment will be hereinafter described with reference to FIGS. 41(*a*) and (*b*).

Assuming that the reversed capacitor is fed to the attitude control 53 along the chute 52*a*, then, the downwardly oriented body of said reversed capacitor sliding along the chute 52*a* abuts against the tip of the thin plate 403 with the leads left within the chute 52*a* as indicated by the real line in FIG. 41(*a*). While in this condition, if the rotary solenoid 60*a* is operated, the L-shaped element 401 rotates with the long piece 401*b* sliding along the curved edge 404*a*. As the element 401 rotates, the body of the capacitor rotates about its own axis while the leads left engaged with an upper corner of the curved edge 404*a*. Further rotation of the element 401 results, as indicated by the dotted line in FIG. 41(*a*), in that the leads overlay the thin plate 403 while the body of the capacitor received in a corner formed between the long piece 401*b* and the curved edge 404*a*. At the time the rotation of the element 401 is stopped in which condition the long piece 401*b* of the element 401 contacts one of the fingers defining the recess 405*a* of the U-shaped element 405 while the thin plate 403 is oriented toward said recess 405*a* as indicated by the chain line in FIG. 41(*a*), the capacitor falls on to the recess 405*a* with the body of the capacitor downwardly oriented and, upon subsequent rotation of the U-shaped element 405 caused by the rotary solenoid 60*b*, the opening of said rcess 405*a* become registered with the chute 52*b* as indicated by the dotted line in FIG. 41(*a*). Thus, the capacitor within the recess 405*a* falls by gravity on to the chute 52*b* with the leads downwardly oriented.

On the other hand, if the standing capacitor is fed to the attitude control 53 along the chute 52*a*, then the capacitor is received by the L-shaped element 401 with the body of said capacitor restricted by the tip of said thin plate 403 while the leads thereof straddle the thin plate 403 as indicated by the real line in FIG. 41(*b*). As indicated by the chain line in FIG. 41(*b*), the condition remains the same as indicated by the real line in FIG. 41 (*b*) during rotation of the L-shaped element 401. After the rotation of the element 401 is stopped, the same process as hereinabove described with reference to FIG. 41(*a*) takes place.

This embodiment has an advantage that the attitude control 53 can be simplified and manufactured at relatively cheaper cost.

Of course, the various embodiments shown in FIGS. 32 to 34, FIGS. 35 to 38 and FIGS. 49 to 41 may be substituted for the embodiment shown in FIGS. 11 to 15 without any substantial reduction of performance of the component mounting apparatus of the present invention.

Although the present invention has been fully disclosed in conjunction with the various preferred embodiments thereof with reference to the accompanying drawings, it is not to be limited thereby. Since various changes and modifications are apparaent to those skilled in the art, such changes and modifications should be construed as included within the scope of the present invention, unless otherwise departing therefrom.

What is claimed is:

1. A component mounting apparatus for automatically mounting on a workpiece in succession a plurality of components each having at least a pair of leads extending in generally radial or parallel relation from the body of the component, which comprises in combination a plurality of magazines each for accommodating therein a stack of component substrates each carrying said components with the leads secured between a sheet member and an adhesive tape placed on said sheet member, means for ejecting each one of said component substrates from a selected one of said magazines, means for separating each one of said components in succession from their common component substrate thus ejected from said selected magazine, means for transporting the component that has been separated from its component substrate, and means for mounting the component thus transported on said workpiece with the pair of leads guided into the corresponding holes of a predetermined pair formed in said workpiece.

2. An apparatus as claimed in claim 1, wherein said ejecting means comprises an ejector having a plurality of a pair of spaced nail members, each pair of which is arranged to eject the lowermost member of the stacked component substrates accommodated in each one of the magazines, and a drawing mechanism comprising a pair of spaced and constantly driven rollers, the number of said pair of said constantly driven rollers corresponding to that of the magazines provided, and pinch rollers respectively engageable with said constantly driven rollers of one pair for intermittently drawing the ejected component substrate on to the separating means.

3. An apparatus as claimed in claim 2, wherein said ejector comprises a pair of parallely spaced and axially slidable rods each formed with a plurality of grooves corresponding to the magazines, clutch blocks of each pair of the number corresponding to the number of said magazines, each of said clutch blocks having a pin member engageable in the corresponding one of said grooves and connected with the corresponding one of the nail members, and detent devices each for one clutch block for retaining the clutch block in a predetermined position when said clutch block is not operated.

4. A component mounting apparatus for automatically mounting on a workpiece in succession a plurality of components each having at least a pair of leads extending in generally radial or parallel relation from the body of the component, which comprises in combination means for supplying the components one after another in any attitude, means for correcting the attitude of each one of said components to a predetermined attitude, means for mounting the components in succession on said workpiece with the pair of leads guided into the corresponding holes of a predetermined pair formed in said workpiece, and a passage means for transporting the components one after another from the supply means to the mounting means, said correcting means disposed on said passage means and comprising a rotor rotatable about its own axis and having a passage connected with said passage means and an inverter bar slidably and rotatably carried by said rotor in alignment with said axis of said rotor and having one end formed with an engagement engageable with the tips of said leads of each one of the components whereby, during movement of said inverter bar from the projected position to the retracted position, said tips of said leads are engaged in said engagement of said inverter bar for bringing said component to said predetermined attitude.

5. A component mounting apparatus for automatically mouting on a workpiece in succession a plurality of components each having at least a pair of leads extending in generally radial or parallel relation from the body of the component, which comprises in combination means for supplying the components one after another in any attitude, means for correcting the attitude of each one of said components to a predetermined attitude, means for mounting the components in succession on said workpiece with the pair of leads guided into the corresponding holes of a predetermined pair formed in said workpiece and a passage means for transporting the components one after another from the supply means to the mounting means, said correcting means disposed on said passage means and comprising a rotor rotatable about its own axis and having a substantially circular groove, open ends of which are located in the proximity of each other, and a retainer formed in an outer wall defining the groove for engagement with the tips of the component leads for reversing the original attitude of said component received in said groove upon rotation of said rotor.

6. An apparatus as claimed in claim 5, wherein said retainer formed in the outer wall defining said groove comprises a cavity and a block pivotally supported within said cavity and normally biased about its pivot so as to form a clearance between said block and a portion of the surrounding edge defining said cavity for receiving therein the tips of the components leads, said clearance being adapted to be closed with said tips of said component leads sandwiched firmly therebetween as said rotor is rotated about its own axis.

7. A component mounting apparatus for automatically mounting on a workpiece in succession a plurality of components each having at least a pair of leads extending in generally radial or parallel relation from the body of the component, which comprises in combination means for supplying the components one after another in any attitude, means for correcting the attitude of each one of said components to a predetermined attitude, means for mounting the components in succession on said workpiece with the pair of leads guided into the corresponding holes of a predetermined pair formed in said workpiece, and a passage means for transporting the components one after another from the supply means to the mounting means, said correcting means disposed on said passage means and comprising a pair of spaced plates forming a space therebetween, a substantially L-shaped rotatable member formed with a receiving plate oriented toward the passage means and a substantially U-shaped rotatable member positioned below said L-shaped rotatable member, both of said members being operatively accommodated within said space, whereby, only when the component is fed to said L-shaped member with the leads downwardly oriented while the body of said components is upwardly oriented so as to straddle over said receiving plate, rotation of said L-shaped member causes the original attitude of said component to be brought to said predetermined attitude.

8. A component mounting apparatus for automatically mounting on a workpiece in succession a plurality of components each having at least a pair of leads extending in generally radial or parallel relation from the body of the component, which comprises in combination means for supplying the components one after another in any attitude, means for correcting the attitude of each one of said components to a predetermined attitude, a retainer unit movable between a first position in which it receives the component fed from the correcting means and a second position in which the component received by said retainer unit can be brought in position to be picked by a mounting means and capable of hammering said component received thereby to shape the leads of said component to a predetermined shape during its movement from said first position to second position, said mounting means for mounting the components in succession on said workpiece with the pair of leads guided into the corresponding holes of a predetermined pair formed in said workpiece, and a passage means for transporting the components one after another from the supply means to the mounting means, said correcting means disposed on said passage means.

9. A component mounting apparatus for automatically mounting on a workpiece in succession a plurality of components each having at least a pair of leads extending in generally radial or parallel relation from the body of the component, which comrpises in combination means for supplying the components one after another in any attitude, means for correcting the attitude of each one of said components to a predetermined attitude, a retainer unit, means for mounting the components in succession on said workpiece with the pair of leads guided into the corresponding holes of a predetermined pair formed in said workpiece, and a passage means for transporting the components one after another from the supply means to the mounting means, said correcting means disposed on said passage means and said retainer unit comprising a drive source, means slidable by said drive source between a retracted position and a projected position and carrying thereon a pivotable saddle-like member in position to receive the component fed from said correcting means when said slidable means is in the retracted position and a hammering member for hammering said component on said saddle-like member to shape the leads of said component to a predetermined shape during movement of said slidable means for said retracted position to said projected position, said mounting means being capable of picking up the component on the saddle-like member on said slidable means when said slidable means is in the projected position prior to mounting of said component on said workpiece.

10. A component mounting apparatus for automatically mounting on a workpiece in succession a plurality of components each having at least a pair of leads extending in generally radial or parallel relation from the body of the component, which comprises in combination means for supplying the components one after another in any attitude, means for correcting the attitude of each one of said components to a predetermined attitude, a retainer unit movable between a first position in which it receives the component fed from the correcting means and a second position in which the component received by said retainer unit can be brought in position to be picked up by a mounting means and capable of hammering said component received thereby to shape the leads of said component to a predetermined shape during its movement from said first position to second position, said mounting means for mounting the components in succession on said workpiece with the pair of leads guided into the corresponding holes of a predetermined pair formed in said workpiece, and a passage means for transporting the components one after another from the supply means to the mounting means, said correcting means disposed on said passage means, said mounting means comprising means vertically movable and rotatable about its own axis for selectively nipping and releasing the body of the component that has been picked up thereby, means for guiding the component leads through the holes of the workpiece as said nipping and releasing means downwardly moves and means rotatable to position either in the X orientation or in the Y orientation said guiding means independently of or together with said nipping and releasing means whereby the mounting of the component on the workpiece can be carried out after the component leads have been aligned with the respective holes of said workpiece.

11. An apparatus as claimed in claim 10, wherein said selectively nipping and releasing means comprises a pair of nippers, a cylinder means and a link mechanism connecting between said cylinder means and said nippers for operating said nippers so as to selectively close to cause said nippers to pick up the component and open to release said component that has been picked up.

12. An apparatus as claimed in claim 10, wherein said rotatable positioning means comprises a torque motor for rotating an outer hollow shaft carrying said guiding means, means for defining the angle of rotation of said torque motor and means for adjusting the angle of rotation of said torque motor.

13. An apparatus as claimed in claim 10, wherein said guiding means comprises at least a pair of guide members each having a guide groove along which the corresponding one of said component leads is guided as said selectively nipping and releasing means is downwardly moved, said guide members being pivotally supported so that the opening of said guide members can be varied and a pair of adjustment screws adapted to restrict the opening of said guide mem-bers to a predetermined value.

14. A component mounting apparatus as claimed in claim 10, further comprising means for clinching portions of the component leads projecting beyond the workpiece thereby to permit said component to be rigidly held in said workpiece, which includes a pair of normally opened anvil members, means rotatable to position said anvil members in conformity with said selectively nipping and releasing means, a cylinder means hydraulically operable so as to vertically move said anvil members between a position in which said anvil members are moved away from said workpiece and another position in which said anvil members are moved close to said workpiece for clinching said portion of said component leads, and means for closing said anvil members, when said anvil members are in said another position, to effect the clinching operation.

* * * * *